United States Patent
Putko

(10) Patent No.: US 10,656,830 B2
(45) Date of Patent: May 19, 2020

(54) METHOD, SYSTEM AND KEYBOARD FOR INPUT OF CHARACTERS

(71) Applicant: Boris Mikhailovich Putko, Kemerovskaya oblast (RU)

(72) Inventor: Boris Mikhailovich Putko, Kemerovskaya oblast (RU)

( * ) Notice: Subject to any disclaimer, the term of this patent is extended or adjusted under 35 U.S.C. 154(b) by 38 days.

(21) Appl. No.: 16/009,016

(22) Filed: Jun. 14, 2018

(65) Prior Publication Data

US 2018/0364905 A1  Dec. 20, 2018

(30) Foreign Application Priority Data

Jun. 15, 2017  (RU) ................................ 2017120996

(51) Int. Cl.
  *G06F 3/00* (2006.01)
  *G06F 3/0488* (2013.01)
  (Continued)

(52) U.S. Cl.
  CPC .......... *G06F 3/04886* (2013.01); *G06F 3/018* (2013.01); *G06F 3/0237* (2013.01);
  (Continued)

(58) Field of Classification Search
  CPC ............... G06F 3/04886; G06F 3/0416; G06F 17/2863; G06F 3/018; G06F 3/0237;
  (Continued)

(56) References Cited

U.S. PATENT DOCUMENTS 4,531,119 A * 7/1985 Nakayama ............. G06F 3/018
                                                   341/28
4,543,631 A * 9/1985 Kurosu ................... G06F 3/018
                                                   345/171

(Continued)

FOREIGN PATENT DOCUMENTS

RU        2011120873 A        11/2012

OTHER PUBLICATIONS

Search Report issued by the The Russian Federal Service for Intellectual Property (in Russian language and English translation), dated Jan. 24, 2018, for Russian Patent Application No. 2017120996; 4 pages.

(Continued)

*Primary Examiner* — Abdelali Serrou
(74) *Attorney, Agent, or Firm* — Faegre Drinker Biddle & Reath LLP

(57) ABSTRACT

The proposed invention relates to the field of inputting simplified Chinese characters, as well as characters of other writing systems that are based on the Chinese characters writing system. The invention essentially offers increased efficiency and speed of inputting characters. Proposed is a method of inputting characters, which comprises: selecting a graph on a graphs matrix, adding said graph to a list of graphs, forming a list of characters by selecting them from a characters description table based on the list of graphs and depending on a preset character selection mode; if there is (Continued)

only one character in the list of characters, automatically transferring this character from the list of characters to the input focus of a program waiting for input, clearing the list of graphs and the list of characters, and proceeding to selecting a graph to input next character; if there is more than one character in the list of characters, displaying the list of characters, wherein if the character is in the first position of the list of characters, transferring this character from the list of characters to the input focus of the program waiting for input, clearing the list of graphs and the list of characters, and proceeding to selecting a graph to input next character; if the necessary character is not present in the first position of the list, proceeding to selecting a next graph or visually finding this character in the displayed list of characters, and transferring it from the list of characters to the input focus of the program waiting for input, clearing the list of graphs and the list of characters, and proceeding to selecting a graph to input next character. In addition, systems and keyboards are proposed to implement the main advantages of the input method: pronunciation independence, speed and ease of input, flexibility, illustrative aspect and ease of mastering the input techniques.

14 Claims, 7 Drawing Sheets

(51) Int. Cl.

| | | |
|---|---|---|
| G06F 3/01 | (2006.01) | |
| G06F 17/28 | (2006.01) | |
| G06F 3/041 | (2006.01) | |
| G06F 3/023 | (2006.01) | |
| G06F 17/27 | (2006.01) | |
| G06F 17/22 | (2006.01) | |

(52) U.S. Cl.
CPC ........ *G06F 3/0416* (2013.01); *G06F 17/2223* (2013.01); *G06F 17/276* (2013.01); *G06F 17/2863* (2013.01)

(58) Field of Classification Search
CPC .... G06F 17/2223; G06F 3/023; G06F 3/0236; G06F 3/0488; G06F 3/04892; G06F 3/0238; G06F 3/0482; G06F 3/04847; G06F 3/0489; G06F 3/04895; G06F 3/04883; G06F 17/214; G06F 17/24; G06F 17/276; G06F 3/04897; B41J 3/01
See application file for complete search history.

(56) References Cited

U.S. PATENT DOCUMENTS

| | | | | |
|---|---|---|---|---|
| 5,586,198 | A * | 12/1996 | Lakritz | G06F 3/018 382/185 |
| 6,809,725 | B1 * | 10/2004 | Zhang | G06F 3/018 345/171 |
| 7,165,022 | B2 * | 1/2007 | Sugano | G06F 17/2863 704/3 |
| 7,315,982 | B2 * | 1/2008 | Becker | G06F 17/2223 704/9 |
| 7,548,860 | B2 * | 6/2009 | Li | G06F 3/018 345/171 |
| 7,711,541 | B2 * | 5/2010 | Sugano | G06F 3/018 345/168 |
| 8,032,357 | B2 * | 10/2011 | Kung | G06F 3/0233 341/28 |
| 8,381,119 | B2 * | 2/2013 | Yeh | G06F 3/04886 345/168 |
| 8,395,536 | B2 * | 3/2013 | Tung | G06F 3/0233 341/28 |
| 8,479,112 | B2 * | 7/2013 | Clow | G06F 3/04886 715/773 |
| 8,677,237 | B2 * | 3/2014 | Li | G06F 3/04883 715/263 |
| 9,292,203 | B2 * | 3/2016 | Winer | G06F 17/276 |
| 2006/0012821 | A1 * | 1/2006 | Franklin | G06K 1/126 358/1.15 |
| 2006/0282583 | A1 | 12/2006 | Kung et al. | |
| 2008/0183460 | A1 * | 7/2008 | Baker | G06F 3/018 704/3 |
| 2008/0284744 | A1 * | 11/2008 | Park | G06F 3/0486 345/173 |
| 2010/0259484 | A1 * | 10/2010 | Jo | G06F 3/018 345/171 |
| 2012/0056815 | A1 | 3/2012 | Mehra | |
| 2012/0206382 | A1 * | 8/2012 | Kusano | G06F 3/0236 345/173 |
| 2012/0235921 | A1 * | 9/2012 | Laubach | G06F 3/0238 345/172 |
| 2012/0246595 | A1 * | 9/2012 | Xie | G06F 3/018 715/799 |
| 2014/0253457 | A1 * | 9/2014 | Lee | G06F 3/018 345/171 |
| 2014/0317550 | A1 * | 10/2014 | Ichiyama | G06F 3/04886 715/773 |
| 2014/0317569 | A1 * | 10/2014 | Zhou | G06F 3/018 715/825 |
| 2014/0354550 | A1 * | 12/2014 | Mendonca | G06F 3/02 345/168 |
| 2015/0040056 | A1 * | 2/2015 | Cho | G06F 3/018 715/773 |
| 2015/0082234 | A1 * | 3/2015 | Lin | G06F 3/04883 715/780 |
| 2016/0085316 | A1 * | 3/2016 | Liu | G06F 3/018 345/467 |
| 2016/0320965 | A1 * | 11/2016 | Chung | G06F 3/0236 |
| 2016/0357304 | A1 * | 12/2016 | Hatori | G06F 3/0237 |
| 2017/0206004 | A1 * | 7/2017 | De Bruyn | G06F 17/2223 |
| 2017/0285761 | A1 * | 10/2017 | Yagi | G06F 3/0488 |

OTHER PUBLICATIONS

1. Wiki, "Wubi Method", available at http://www.thefullwiki.org/Wubi_method, 8 pages (Nov. 17, 2009).
2. D. Chen et al., "Wubi86 Table," available at http://raw.githubusercontent.com/definite/ibus-table-chinese/master/tables/wubi-jidian/wubi-jidian86.txt, first 20 pages (Dec. 5, 2008).
3. C. Bangfu, "Overview of the Cang-Jie Method," available at http://www.cocoanutstech.com/cang_jie/www.cjmember.com/the_cj_method.htm, 2 pages (Dec. 17, 2005).
4. Wikipedia, "Cangjie input method", available at https://en.wikipedia.org/wiki/Cangjie_input_method, 10 pages (captured Feb. 5, 2013).
5. R. Xiao, Lancaster Corpus Compilation of Chinese Character Frequency, available at http://www.lancs.ac.uk/fass/projects/corpus/data/Chinese_character_frquency_list.zip, 132 pages (2006).
6. R. Xiao, Lancaster Corpus Compilation of Chinese Word Frequency, available at http://www.lancaster.ac.uk/fass/projects/corpus/data/top50000_Chinese_words.zip, 626 pages (2006).

* cited by examiner

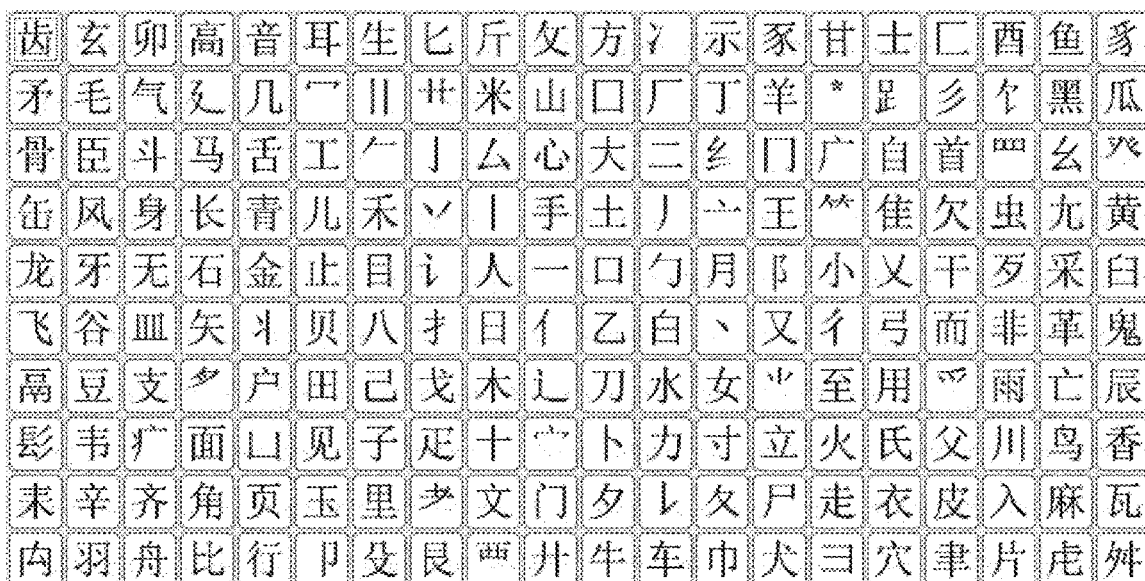
FIG.2
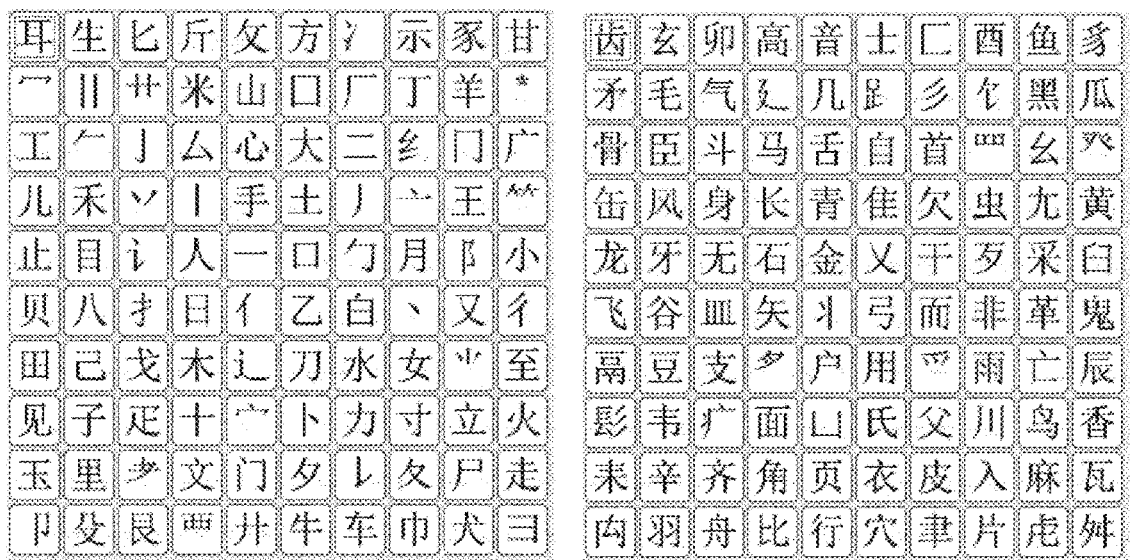
FIG.3
FIG.4

METHOD, SYSTEM AND KEYBOARD FOR INPUT OF CHARACTERS

CROSS REFERENCE TO RELATED APPLICATIONS

This application claims priority to Russian Application No. 2017120996, filed Jun. 15,2017, the disclosure of which is hereby expressly incorporated by reference in its entirety.

FIELD OF THE INVENTION

The disclosed method, systems and keyboards for inputting characters are designed for inputting simplified Chinese characters (hieroglyphs) on any digital devices: computers, tablets, smartphones, telephones, etc., capable of receiving text input for further processing and use. Principles of the present invention can also be used for inputting traditional Chinese characters, as well as characters of other Chinese characters-based writing systems, for example, Japanese characters.

BACKGROUND OF THE INVENTION

There are three basic (in terms of prevalence) groups of methods for inputting characters.

1. Handwritten methods. The method completely emulates writing a character on paper. A character is uniquely identified by the sequence, size and relative position of standard strokes, the number of which may range from 32 to 36. Traditionally, a stroke is an element of a character, which can be drawn without tearing off the brush from paper. For example, a character " · " (one) consists of one stroke "—", character " 三 " (three) consists of three strokes "—", and character "乙" (second) consists of one stroke "乙" as well. Machine "recognizes" the inputted character using certain algorithms and offers the user an option (or options) to insert it into a respective position (known as an input focus) in a program waiting for input. Needless to say about the speed of handwritten input, because the number of strokes in character can reach several dozens, and for correct recognition of the character drawn by the user, accuracy of reproduction is required on three parameters: sequence of input of strokes, their relative position and size. It is clear that the speed of such handwritten characters input is in principle not higher than the speed of writing characters on paper. The handwritten input has only one advantage: it does not require a new skill for those who have already completed the training course on writing on paper.

2. Phonetic methods. Character is inputted based on its normative sound (e.g. Beijing dialect, Cantonese, etc.), which is written by Latin letters (pinyin) or Cyrillic letters (palladium) or letters of the Chinese phonetic alphabet (zhuyin). There are other ways of writing the pronunciation of characters, but they are not widely spread and fundamentally do not differ from the above. The most common phonetic input is by pinyin. Phonetic input has two main disadvantages.

1. There is no one-to-one correspondence between character and its sound. Certain character can be pronounced differently (have up to 8 versions of reading); separate syllable can correspond to several dozens of characters (about 25 thousands of Unicode characters are "sounded" with only 1314 Chinese syllables, each syllable corresponds in average to 19.3 characters, only 57 syllables are written with one character, while syllable "and" of the 4th tone ("yi") in Unicode corresponds to 337 characters). Therefore, there is a problem of selecting a desired character from all characters proposed by the system in response to sound input. It is clear that the selection from possible versions reduces the speed of input, requiring additional attention and additional manipulations from the user.

2. Phonetic input is not possible for characters, whose pronunciation is forgotten or unknown to the user at all, which happens often, for example, when searching for unknown characters in a dictionary.

3. Shape-based methods. It is possible to try to eliminate the deficiencies of phonetic input with the aid of shape-based input methods. These methods, relying on analysis of the graphic structure of a character, are not associated with its pronunciation, hence, the second disadvantage of phonetic methods can be immediately eliminated, i.e. they allow input of characters with unknown pronunciation.

First of all, radical-based methods of inputting characters are worth noting, which fully emulate the search of character in a "paper" dictionary. Radicals graphically represent certain individual components of characters. Characters in many "paper" dictionaries are indexed by radicals, and radicals in this index are arranged in order of increasing the number of strokes. As radicals are used to index characters, they must be separate, easily identifiable, frequently occurring blocks in the character composition. Most often radicals are positioned "at the beginning" of a character: at the left or on the top (as a trace of the fact that originally characters were written from top down). Some of radicals are simple strokes, some are independent characters, some of radicals have variants that are sometimes noticeably different in inscription compared to the main radicals. In general, variants differ from radicals in that they cannot act as a separate character in this inscription, but are found only in composition of other characters, preserving their radical meaning, i.e. characters, which include these variants, are in the index in the same group of characters as characters with the main radical in their composition. It is clear that the set of radicals is bound to a particular dictionary, and in reality a number of radicals differs from dictionary to dictionary at the originator's will, and can reach, along with their generally accepted variants, almost three hundred pieces. Kangxi radicals set, which exists from the 18th century and is made up of 214 radicals, is regarded as classic one. It should be borne in mind that radicals traditionally have a semantic component: each of them has a "name" and is identified with a certain group of phenomena, actions, objects. The semantic component of radicals is widely used in mnemonics memorizing meanings of specific characters containing a particular radical. Thus, learning the radicals is an indispensable element of the study of hieroglyphics in general.

Radical-based input methods use either a virtual keyboard on the device screen, or even handwritten input. The only component isolated in the character structure is its radical; the remaining part of the character is characterized by one aggregate parameter—the number of strokes of the character except for the strokes of the radical itself. Thus, the non-radical character components are irrelevant: radical is the main identifier of the character, the rest are not important. Whether they (the remainders) coincide with other radicals, their combination or with their part is of no importance. The user needs to know radical for each character and remember (or calculate in mind) the number of strokes in the remainder. The number of strokes of the character, excluding the number of strokes of the radical itself, is the second mandatory search parameter. See, for example, U.S. Pat. No. 6,809,725 B1, "On screen Chinese keyboard" (Jishan Zhang, 26 Oct. 2004). On the virtual keyboard described in the patent '725 for radical-based input, the keys are arranged in order of increasing the number of strokes. The user initially sees only groups of radicals from 1 to 10 strokes (the last group includes all other radicals having more than 10 strokes), and must specify the needed group, then a list of radicals with the specified number of strokes appears, which also requires making a choice. The user selects the number of additional strokes in the remaining part of the character (the number of character strokes, excluding radical strokes). After that, a list of characters, containing this radical and the specified number of strokes in the remainder, is displayed. The user must select the needed character from the list. The method is usable for searching characters in a dictionary, but is not suitable as a text input method due to the large number of necessary manipulations, large number of candidate characters in each "radical-stroke" group and, thus, low speed of such input.

There are also methods that use the idea of combination of radicals. See, for example, U.S. Pat. No. 5,586,198 A, Method and apparatus for identifying characters in an ideographic alphabet (Lakritz David, 17 Dec. 1996). This patent '198 describes a method and apparatus for identifying symbols in an ideographic alphabet, which allow a user to graphically describe a symbol using a set of its components. The method uses combinations of 82 radicals. The document does not disclose how many characters can be inputted using such combinations. The user places components in the desired sequence directly on the screen using the drag-n-drop operations on the components. Matrix (or "canvas") where the character is assembled is divided into 9 sectors, and the machine "itself" takes into account the relative position of the components, because it "knows" in which sector the operator has placed a particular component. Therefore, for identifying the character this method takes into account, apart of components, also their relative position. But it is almost impossible to describe all characters with such a small set of components, so the uncertainty level in the input remains high. Indeed, in the example of FIG. 3 of patent '198 character 苷 is identified with the aid of three components. But in the same way, with the aid of the same components, 4 characters more are identified. With this set of radical components, character 咕 is not distinguishable for the machine for example from character 若. Therefore, the identification is ambiguous and, for inputting character, additional attention is required from the user and additional manipulation to select the desired character from five proposed. Advantages of this method include the use of radicals as a natural and familiar for the Chinese hieroglyphics division of characters into components.

The following group of shape-based input methods will be, for definiteness, referred to as structural coding methods. These methods rely on the idea of coding the graphic structure of character with the aid of letters of the Latin alphabet. Essentially, some rules are introduced for decomposition of character into "standard", pre-defined components. Each of these components is assigned a certain letter of the Latin alphabet and is positioned on the corresponding key of the standard Latin keyboard. The user presses the keys successively, i.e. enters a sequence of letters representing the sequence of character components; the machine identifies characters from this received letter code and outputs a list of candidate characters associated with the inputted sequence of components; the user should specify in some way which of the candidate characters should be inserted into the text. The best known methods of structural coding are wubi and Cangjie.

Wubi method uses from 204 to 227 components in different implementations, almost half of them graphically coincide with the classic Kangxi radicals or their variants, some are represented by separate radical elements, the other part is represented by separate strokes (about 90 "non-radical" components, i.e. those that do not graphically resemble radicals). All these components are "bound" to 25 keys of the standard Latin keyboard, so each key corresponds to 3 to 14 components, and accordingly, from 3 to 14 components have the same letter code. The logic of arrangement of components on the keyboard, their binding, has a complex structure and is related not to the convenience of input, but to an attempt to facilitate the memorization of this complex component structure. The used components are not equally significant. There are five "basic strokes", according to which the remaining components are divided into five groups based on the first stroke of each component, 25 "basic characters", which can also act as components (and then they are inputted by other rules, different from the rules for inputting the basic characters), and usual components. Decomposition rules are quite complex and depend on the type of arrangement of components in the character, there are four types of arrangement. Decomposition of some characters requires taking into account the relative position of components in the form of so-called "distinction code". Distinction code is a combination of "component number", which is determined by the component's belonging to one of the five groups of basic features and the types of relative positioning of components in the character: left-right, top-bottom, and mixed type. Since there are five basic features and only 15 distinction codes, therefore, 15 keys perform, besides inputting component codes, the function of inputting distinction codes, these codes being the same Latin letters that encode the components. In some situations, during decomposition, one more parameter becomes important, the "last stroke" of the component. To minimize the use of distinction codes, the developers introduced different rules for definition of this "last stroke" of character for 4 different types of characters.

When inputting components, the user generally repeats the order of writing strokes in character, but there are some exceptions. Characters are not identical by input method, i.e. there are different input algorithms for different types of characters. For example, to input basic or "capital" characters, the corresponding key must be pressed several times (two to four times). For a part of a character, the keys corresponding to components of the desired character must be simply pressed in succession. For some characters, the code of relative position of these components (aforementioned distinction code) should be also inputted. For some characters, two letters should be inputted, and then the input must be completed up to four characters with the L key.

All these algorithmic actions are required to obtain for each character a unique alphabetic code that allows identifying it, for example:

± —fghg
+ —fgh
人 —w
员 —km
呗 —kmy
手 —rtgh
金 —qqqq
. . . etc.

The machine "works" just with these codes, selecting desired characters as the letters are being inputted. Analysis of opportunities of the method is based on the table of correspondence of letter codes to characters, including the published "Wubi86 Table". When using the code, input of character requires up to four manipulations (keystrokes), and only 636 characters of all possible ones can be uniquely identified after pressing one or two keys. Developers found it possible to add to the table of characters both polysyllabic words consisting of two characters and whole phrases (up to 9 characters). However, the code does not provide unambiguous identification of character or word, and from the whole set, 16.75% of the codes correspond to two or more (in reality up to 45) characters or words, and 44% of characters (or words) are not identifiable at all, i.e. have codes overlapping with other characters, and after inputting these codes, an additional selection is required from the user.

Cangjie method uses 24 basic and 87 secondary "characters", or 111 characters in total. Of these, 44 characters are graphically different from the Kangxi radicals. The basic characters coincide with the radicals, and from the secondary ones some graphically coincide with individual radicals, some with their variants, some with strokes, and a small part includes just graphic components of a character, not represented in the previous groups. Of the 24 basic characters, only 13 coincide with the basic wubi characters. Among the secondary characters there are also those coinciding with the wubi components, but there are also different ones. The principle of this method is, as in the wubi method, in "binding" the characters to the codes of Latin keys. 24 keys are used to indicate the characters. In the Cangjie, one key is used for 2 to 8 characters. Even the characters coinciding with wubi are naturally bound to other keys, since these methods have different principles of arranging the characters on the keyboard. Decomposition rules of the Cangjie method seem to be simpler than that of wubi, but this method also requires taking into account different types of characters: single-unit, two-unit and three-unit characters, whose decomposition differs from each other. Due to the fact that the number of characters used is almost 2 times smaller than in the wubi method, and the number of keys used for encoding is less by one, the length of the resulting alphabetic code for graphically complex characters becomes larger. To speed up the input (reduce the number of manipulations), developers of the Cangjie method added rules for excluding certain characters to reduce the number of symbols in the obtained letter code of some characters. Despite this, the maximum number of symbols when inputting a single character in the Cangjie method still reaches 5, and only 238 characters are uniquely identified after pressing one or two keys. At the same time, 22.2% of characters are not uniquely identified. For such uniquely non-identifiable characters, the user is offered a choice from 2 to 8 variants. This, of course, is better than in the wubi method, but still there is no one-to-one correspondence between the code and the character.

Both methods have the same disadvantages: complexity of decomposition rules, heaviness and sophistication of organization of letter codes for characters, respectively, and difficulty of remembering the necessary sequence of keystrokes for inputting characters. The lack of one-to-one correspondence of codes and characters requires additional attention and actions of the user. The limited code binding field (25 and 24 keys) increases the number of necessary manipulations, and the input speed drops. On modern devices with a small touch screen the usual advantages of the keyboard in terms of input speed are lost because input on these devices usually involves the use of only one hand (the second holds the device). At the same time, the disadvantages of distribution of components on a small number of keys are retained. This distribution is uneven; it is not completely targeted at the convenience of inputting these components either by their sequence or frequency of use, which results in unnecessary movements of the mouse pointer or finger on the touch screen, respectively, reduces the input speed.

Decomposition rules of the structured coding methods have two aspects. The first is the aspect of the developer who needs decomposition rules to obtain the minimum possible unique code for each character. As described above, this aspect does not work well because of the lack of one-to-one correspondence of codes and characters in both wubi and Cangjie methods, despite their complexity, abundance of groups and styles, and many exceptions. The second aspect is the aspect of the user who needs to know this complex system of rules, conventions and exceptions in order to exactly repeat the developer's actions and reach the same result. It is clear that eventually the user, regardless of the decomposition rules, should simply remember the sequence of keystrokes for inputting a particular character. During text input, the user has no more time to manage with the decomposition. But the user does not have another method to get information about the desired sequence of keystrokes than to try to perform decomposition one way or another, as he cannot get help from the machine. In the actual input process, the user does not even see the components he has already inputted, but sees only a set of letters representing the sequence of keys he pressed, i.e. the input is performed "blindly". In both structural coding methods, all the information on decomposition and matching the components to alphabetic codes is hidden from the machine; all of it is concentrated in the user's head. As already mentioned, the machine "knows" only the correspondence of letter codes to characters; complete information on actual graphical composition of character components after such encoding is lost forever and cannot be restored. Therefore, it is impossible to expect aid from the machine in situations of uncertainty: either the user inputted correct sequence of codes and got the desired character at output, or he made a mistake and got an absolutely unexpected result. Therefore, the abilities of these methods to find characters, by analogy with the known ones, based on the presence of similar component blocks, simply on the selection of all the characters having a particular component at the beginning or end of the character, are extremely limited. The artificial manner of isolating components, the lack of visibility both in decomposition and in binding components to a limited number of keys make it difficult for the user to master these methods.

PROBLEM SOLVED BY THE INVENTION

The present input method is aimed at the provision of a simple, visual and efficient input of characters most commonly used in modern Chinese language. However, as mentioned above, the principles of the present invention can also be used for traditional Chinese characters, as well as for others writing systems based on Chinese characters, for example Japanese characters. The most commonly used characters will be considered the characters, which are used in modern Chinese with a frequency greater than once per million characters of text. The character use frequency was calculated on the basis of the Lancaster corpus of characters compiled by Dr. Richard Xiao in 2006. The Lancaster corpus comprises 4336 such characters. By input efficiency the value inverse of the number of user manipulations necessary for unambiguous identification of a character by a machine is meant herein. The more user manipulations are required, the less efficient the input method will be. It is clear that the input efficiency directly affects the limit of the input speed; therefore, other things being equal, the theoretically achievable input speed will be higher for the method whose number of manipulations is less.

The present method makes it possible to uniquely identify 72.5% of used characters (3146 characters) even after two manipulations, which is incomparably greater than by the wubi (651 characters) and Cangjie (238 characters) methods. The maximum number of manipulations needed to identify one character for the present input method is 3, while in wubi it is 4, and in Cangjie 5. Also it should be noted that the described structural coding methods require, after identification of character, user intervention for the act of input itself, i.e. for transferring the character to the input focus. The present input method allows the machine to track input complete flag for components and automatically transfer, without user's participation, the identified character to the input focus (for details. Therefore, the user "saves" one manipulation and does not need to specify to the machine the character, which should be transferred to the input focus. This situation is realized at inputting 93.2% of all characters by this method. In the remaining 6.8% of cases, when further input of the components is still possible in principle (that is, no input complete flag detected), but the needed character has already been identified by the machine, the user may send it by separate manipulation to the input focus of a program waiting for input from the keyboard.

Efficiency of inputting characters as combinations of components from a fixed set of components depends precisely on the set itself, its composition and the number of components in it. Therefore, the object is to provide a set of components that would be sufficiently representative, i.e. that reflects all the graphic elements contained in characters; completely eliminate the uncertainty of characters identification, i.e. enable unique identification of each character from the set under consideration; the set of components should have an observable size and be easily memorable.

SUMMARY OF THE INVENTION

The input method disclosed herein, unlike the aforementioned structured coding methods, assumes that the system implementing it stores information about graphical composition of each character—real sequence of its components (hereinafter referred to as graphs), rather than a set of alphabetic codes obtained by the decomposition procedure and simply associated with a characters. The user can see the set of graphs either on screen of a user device as a matrix of graphs (FIG. 2) on the virtual keyboard, or on keys of a hardware keyboard, and can "assemble" the needed character from known graphs, simply by specifying necessary graphs in the proper order. The order of graphs in description of each character is determined by character decomposition rules. The character decomposition rules in the present invention are extremely simple: 1) a direction of decomposition from top left to right down, for enclosing graphs (i.e. those within which other graphs are located)—from outside to inside; 2) all collisions of decomposition (i.e. ambiguity of character description) are resolved by adding to the character description an "empty" modifier graph denoted by symbol "*" in the character description about locking keys, as described below. Section 6). The user does not need to remember the complicated decomposition rules, it is enough to understand and remember the rule of direction of decomposition and the prohibition on division of graphs, as described below. Since the system stores information about the sequence of graphs of each character, it can find all the characters that satisfy even not quite accurate user queries, for example, show those (and only those) characters where the specified graph is in the first or any other position, or in combination with any other graph(s) also in any position. This is provided by several character selection modes, some of which provide quick input, other simple and flexible searches for new and unknown characters as described above.

To describe graphical structure of characters on the basis of the classic set of Kangxi radicals (with some changes, which will be described in detail later in Section 6), a set of 200 graphs was developed (see Table 1). Kangxi radicals quite fully cover the graphic composition of characters, but some of them are extremely rare, for example, radical 龠, which is also a separate character, is encountered, in the Lancaster characters corpus, with a nullifying frequency of 2 times for over 58 million characters as a separate character and never in the composition of other characters. In addition to the traditional Kangxi radicals, characters contain "non-radical" components, i.e. such that do not have a graphic similarity with traditional Kangxi radicals, and which, however, quite accurately and unambiguously discriminate characters. For example, it is enough to look at characters 厶 and 㠯. The top element of the latter character is not represented in the list of Kangxi radicals, but exactly this element distinguishes this character from the former one, which is exactly the radical. As noted above (see Section 2, radical-based input method), Kangxi radicals are widely used in traditional hieroglyphics and are known to almost every person who is learning characters. This, in fact, is the basis of traditional hieroglyphics. Therefore, the closer the set of graphs used in the present invention to the Kangxi radicals, the easier to master the present input method. In the proposed set, only 8 graphs are not Kangxi radicals or their variants. Consequently, mastering such a set will not be difficult for the user.

On the basis of the aforementioned set of graphs developed by the author of the present invention, taking into account the aforementioned decomposition rules, the author also compiled a characters description table, which describes for each character the complete sequence of its constituent graphs and specifies its marker—the minimal sequence of graphs, uniquely identifying a given character among the considered plurality of characters. The order of marker graphs keeps their relative position in the complete sequence of character graphs (by way of example, Table 2 below shows a part of the characters description table). Input of character is performed as selection of it from the characters description table according to the parameters specified by the user: graphic composition of its components, i.e. sequence of graphs, and variable selection modes, which will be described in detail below. Based on this input method, keyboards and systems have been developed for quick input of characters and for facilitating search for unfamiliar characters based on any combination of its graphs. Keyboard comprises a plurality of keys (hardware or virtual) coding graphs, keys for inputting punctuation marks, numbers and one or more service or control keys. Compilation of the characters description table involved visual analysis of as many characters as possible, isolation of repeated graphs from them, and description of as many characters as possible with these graphs. In isolation of duplicate graphic elements, the Kangxi radicals system was used as a basis, from which some radicals rare in characters were removed, and to which some non-radical graphic elements were added. Also, an additional modifier graph obtained as a result of this isolation was included in the set of graphs, as described below, which is not present as a graphic element in the character composition, but provides the uniqueness of its description if necessary. As a result, the obtained characters description table includes, for each character, a unique sequence of graphs that unambiguously identifies each character from the considered set. On the basis of these unique sequences for each character, shorter graph sequences can be isolated, which do not lose their uniqueness when the number of graphs decreases, and generally include only the first, second, and last graphs of the character or, as a rare exception, the first, second, next to last and last graphs. These sequences, being unique identifiers of characters, in turn, can be used to find the above markers as minimal sequences of graphs sufficient to identify each character. For more details on these aspects of the present invention, see Section 6.

Calculation of occurrence frequencies of graphs in the composition of markers made it possible to arrange the graphs on the keyboard in such a way that the graphs most often met in the markers were concentrated in the center of the keyboard, and when inputting an arbitrary text, a minimum movement of the pointing device or the user's fingers would be required on the virtual or hardware keyboard (see FIGS. 2-6). The inventive layout of the keyboard graphs is also unique and not known from prior art structural input methods. The layout further increases the efficiency of input according to the present invention. At the same time, information about the composition of markers can be used for locking meaningless combinations of graphs in the input process. This reduces the number of possible mechanical errors of the user and facilitates mastering the input method about locking keys, as described below.

BRIEF DESCRIPTION OF THE DRAWINGS

FIG. 2 is a layout of graphs on a full-size keyboard according to a first embodiment of the present invention.

FIG. 3 is a layout of graphs on a reduced keyboard according to a second embodiment of the present invention (initial and alternative states).

FIG. 4 is a layout of graphs on a compact keyboard according to a third embodiment of the present invention (initial and alternative states).

DETAILED DESCRIPTION OF EMBODIMENTS OF THE PRESENT INVENTION

Figure 1:
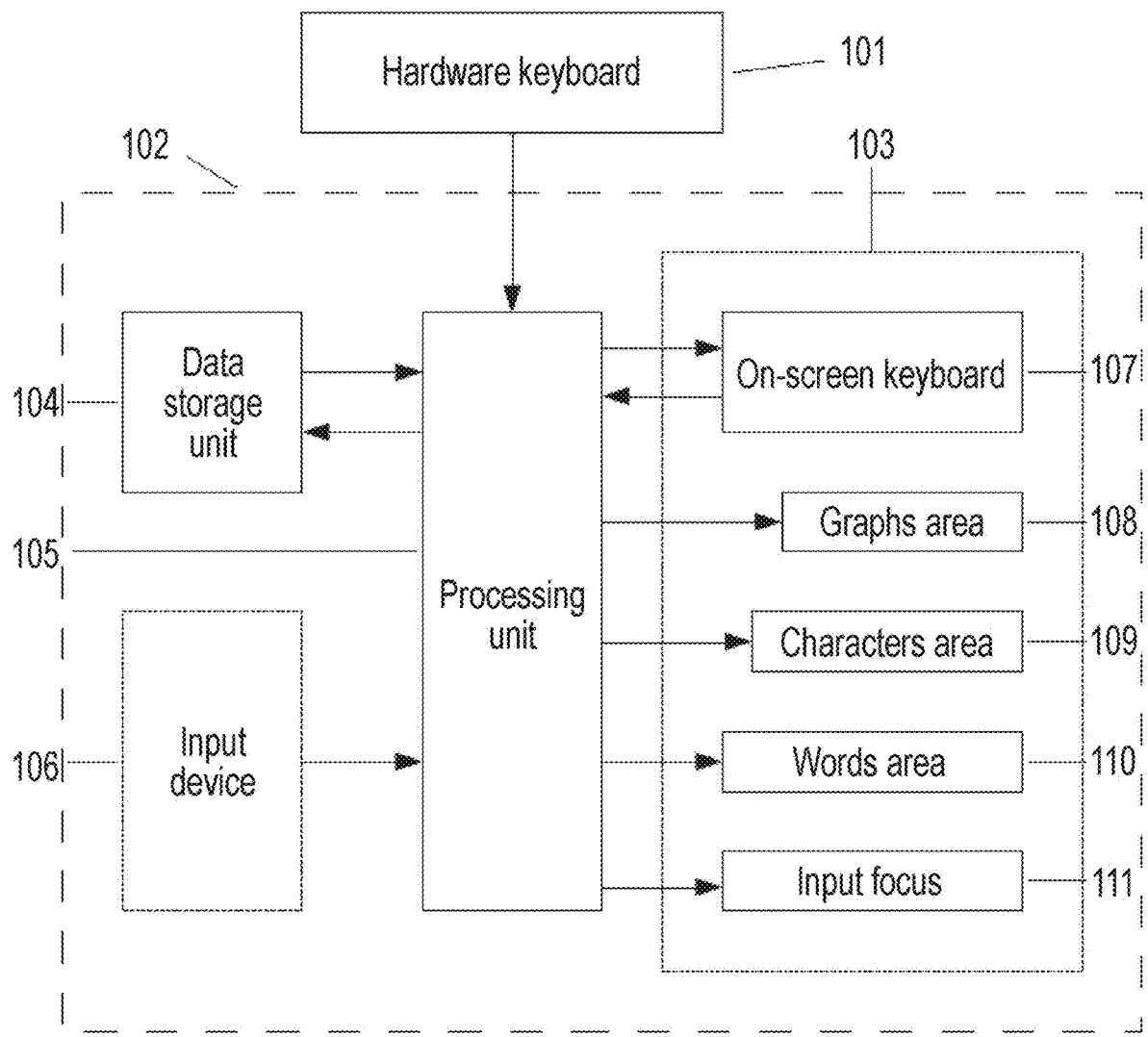
FIG. 1 is a logical diagram of a system for inputting characters.

Preferred embodiments of the present invention will now be described in more detail with reference to the drawings in which identical elements in different figures are identified, where possible, by the same reference numerals. These embodiments are presented as explanations of the present invention, which, however, should not be limited thereto. Those skilled in the art will appreciate after studying this detailed description and the drawings that various modifications and alterations can be made.

The present method of inputting characters is designed for simplified Chinese characters. However, similar principles can be used in developing a method of composite input for traditional characters, as well as for other Chinese characters-based character writing systems, for example, Japanese characters.

The present method is based on the fact that all characters consist of a limited set of indivisible components, which will be referred to as graphs. For example, character 我 ("I") consists of two graphs: 手 and 戈, and character 鹅 ("goose") consists of three graphs: 手, 戈 and 鸟. The input method according to the present invention does not contemplate any hierarchy of characters, any difference between them in terms of input processing algorithms. When developing this method, it was taken into account that graphs should completely cover the entire graphic variety of characters, i.e. characters should consist of graphs and only graphs, and composition of characters should not include any element that does not belong to the developed set of graphs; division of each character into graphs should be unique, and a sequence of graphs of each character should be unique. Proceeding from these requirements, a minimal necessary set of 200 graphs was formed on the basis of Kangxi radicals in the process of visual analysis of the considered set of most frequently used characters; this set is exhaustively listed together with variants of inscriptions of the graphs in characters in the following Table 1. Part of Kangxi radicals was not included in the developed set of graphs because of the rarity of their use, some of non-radical elements that do not have a graphic similarity to the traditional Kangxi radicals or their variants have been added to the set of graphs as separate graphs (these graphs are marked by letter "H" in Table 1). As shown in the analysis of structural coding methods (see e.g. Cangjie method in Section 2), reducing the number of components leads to increasing the length of the coding sequence and thus to reducing the input efficiency due to increased number of necessary manipulations during input. Greater number of graphs can reduce a little the number of required components in the description of some characters, but on the inevitably limited space of mobile screens the "price" of such an increase is reduced due to the high "cost for place": it is physically difficult to arrange a large set of graphs on a small-size screen, this impairs the convenience for the user and the visibility of the set of graphs.

Table 1. Set of graphs developed by the author for use in the method, keyboards and input systems of the present invention.

| 1  | ⸺ |   |   |   |   |
|----|---|---|---|---|---|
| 2  | 冂 |   |   |   |   |
| 3  | 亻 |   |   |   |   |
| 4  | 乙 | 丶 | 乚 | 乛 | ⟶ |
| 5  | 人 |   |   |   |   |
| 6  | 勹 |   |   |   |   |
| 7  | 日 |   |   |   |   |
| 8  | 豕 |   |   |   |   |
| 9  | 手 | 扌 | 才 |   |   |
| 10 | 土 |   |   |   |   |
| 11 | 夕 |   |   |   |   |
| 12 | 方 | 夕 | 刂 |   |   |

-continued

| | | | | |
|---|---|---|---|---|
| 13 | 亅 | | | |
| 14 | 丿 | | | |
| 15 | 木 | | | |
| 16 | 氺 | 氵 | 水 | |
| 17 | 讠 | 言 | | |
| 18 | 月 | | | |
| 19 | 扌 | | | |
| 20 | 丶 | | | |
| 21 | 丷 | | | H |
| 22 | 亠 | | | |
| 23 | 攵 | 乞 | | |
| 24 | 女 | | | |
| 25 | 心 | 忄 | 小 | |
| 26 | 大 | | | |
| 27 | 卜 | | | |
| 28 | 厶 | | | |
| 29 | 二 | | | |
| 30 | 十 | | | |
| 31 | 为 | | | |
| 32 | 丨 | | | |
| 33 | 艹 | 茅 | | |
| 34 | 疋 | | | |
| 35 | 寸 | | | |
| 36 | 扌 | | | |
| 37 | 目 | | | |
| 38 | 八 | | | H |
| 39 | 又 | | | |
| 40 | 禾 | | | |
| 41 | 王 | | | |
| 42 | 已 | | | |
| 43 | 宀 | | | |
| 44 | 亻 | 门 | | H |
| 45 | 子 | | | |
| 46 | 立 | | | |
| 47 | 山 | | | |
| 48 | 日 | | | |
| 49 | 门 | | | |
| 50 | 夕 | | | |
| 51 | 米 | | | |
| 52 | 广 | | | |
| 53 | 文 | | | |
| 54 | 乚 | | | |
| 55 | 廾 | | | |
| 56 | 丁 | | | H |
| 57 | 步 | 老 | | |
| 58 | 夂 | | | H |
| 59 | 辛 | | | |
| 60 | 里 | | | |
| 61 | 尸 | | | |
| 62 | 止 | | | |
| 63 | 小 | | | |
| 64 | 页 | | | |
| 65 | 彳 | | | |
| 66 | 欠 | | | |
| 67 | 方 | | | |
| 68 | 井 | | | |
| 69 | 牛 | | | |
| 70 | 几 | | | |
| 71 | 禁 | | | |
| 72 | 田 | | | |
| 73 | 工 | | | |
| 74 | 广 | | | |
| 75 | 辶 | | | |
| 76 | 火 | 灬 | | |
| 77 | 斤 | | | |
| 78 | 氵 | | | |
| 79 | 西 | 西 | | |
| 80 | 车 | | | |
| 81 | 七 | | | |

-continued

| | | | | |
|---|---|---|---|---|
| 86 | 示 | 牙 | | |
| 87 | 礻 | | | |
| 88 | 生 | | | |
| 89 | 豕 | 及 | | |
| 90 | 发 | | | |
| 91 | 犬 | 犭 | | |
| 92 | 一 | | | |
| 93 | 虫 | | | H |
| 94 | 玉 | | | |
| 95 | 辶 | | | |
| 96 | 释 | 肯 | | |
| 97 | 卩 | | | |
| 98 | 日 | 日 | 日 | |
| 99 | 國 | | | H |
| 100 | 盆 | | | |
| 101 | 义 | 氺 | 井 | 中 |
| 102 | 弓 | | | |
| 103 | 齐 | | | |
| 104 | 隹 | | | |
| 105 | 广 | | | |
| 106 | 用 | | | |
| 107 | 舌 | | | |
| 108 | 自 | | | |
| 109 | 十 | | | |
| 110 | 为 | | | |
| 111 | 儿 | | | |
| 112 | 县 | 足 | | |
| 113 | 页 | 衤 | | |
| 114 | 衣 | | | |
| 115 | 者 | | | |
| 116 | 土 | | | |
| 117 | 竹 | | | |
| 118 | 穴 | | | |
| 119 | 石 | | | |
| 120 | 干 | | | |
| 121 | 矢 | | | |
| 122 | 雨 | | | |
| 123 | 长 | | | |
| 124 | 礻 | | | |
| 125 | 歹 | 肉 | | |
| 126 | 四 | 爪 | | |
| 127 | 马 | | | |
| 128 | 首 | | | |
| 129 | 音 | | | |
| 130 | 父 | | | |
| 131 | 又 | | | |
| 132 | 乡 | | | |
| 133 | 角 | | | |
| 134 | 麦 | | | |
| 135 | 高 | | | |
| 136 | 二 | | | |
| 137 | 比 | | | |
| 138 | 而 | 中 | | |
| 139 | 龙 | | | |
| 140 | 厂 | | | |
| 141 | 雕 | | | |
| 142 | 聿 | | | |
| 143 | 身 | | | |
| 144 | 虫 | | | |
| 145 | 支 | | | |
| 146 | 爾 | | | |
| 147 | 珠 | | | |
| 148 | ⺳ | 网 | | |
| 149 | 广 | | | |
| 150 | 用 | 微 | | |
| 151 | 气 | | | |
| 152 | 个 | 食 | | |
| 153 | 齐 | | | |
| 154 | 入 | | | |
| 155 | 卯 | | | H |
| 156 | 雷 | | | |
| 157 | 舟 | | | |
| 158 | 片 | | | |
| 159 | 穴 | | | |

| | |
|---|---|
| 162 | 粱 |
| 163 | 谷 |
| 164 | 革 |
| 165 | 风 |
| 166 | 龙 |
| 167 | 鼠 |
| 168 | áº |
| 169 | 鼠 |
| 170 | 虍 |
| 171 | 韦 |
| 172 | 鸟 |
| 173 | 毛 |
| 174 | 黑 |
| 175 | 辛 |
| 176 | 麻 |
| 177 | 鱼 |
| 178 | 鱼 |
| 179 | 豕 |
| 180 | 走 |
| 181 | 龙 |
| 182 | 白 |
| 183 | 飞 |
| 184 | 鬼 |
| 185 | 缶 |
| 186 | 黄 |
| 187 | 邑 |
| 188 | 辰 |
| 189 | 骨 |
| 190 | 罗 |
| 191 | 彡 |
| 192 | 香 |
| 193 | 矛 |
| 194 | 瓜 |
| 195 | 末 |
| 196 | 瓦 |
| 197 | 齿 |
| 198 | 豸 |
| 199 | 肉 |
| 200 | 舛 |

Graphs in Table 1 are arranged in order of decreasing frequency of their use. The first position of each line (after the line number) identifies the main graph, and subsequent positions, if there are any, show variants of inscriptions of this graph in different characters. All variants of Kangxi radicals included in the set of graphs are usually assigned to the same graph, i.e. variants of such radicals are considered to be variants of the graphs that have coinciding inscription. In other words, if a graph coincides with a Kangxi radical (or with one of its variants), then all other variants of this radical are variants of this graph, and therefore, as a rule, in Table 1 they are summarized in one line. An exception is 2 graphs: "亻" (line 3), variant of the radical "人" isolated into a separate graph, and "扌" (line 19), variant of the radical "手" isolated into a separate graph. Separation of these two Kangxi radicals and use of their variants as separate graphs are associated with a high degree of uncertainty otherwise. For example, if graph "扌" is considered as a simple variant of graph "手" (as tradition does with the radical "手"), then characters "右" and "扣" will be indistinguishable for the machine, because the sequence of graphs of both characters will be the same: "手" and "口" (the first graph of character 右, as seen from line 9 of Table 1, is a variant of graph 手). The same is true in respect of characters "左" and "扛", and in other similar cases. In the characters description table, all variants of graph inscriptions are represented by one graph, in this case the first one in a line of Table 1. It is quite clear that all variants of graphs are equivalent in this respect, and can be used with some degree of convenience as the main graph in the characters description table. For example, any of the five variants of the graph from line 4 in Table 1 can be used as the main graph in the characters description table. In case of preserving the uniformity of description of characters, replacement of variants of graph inscriptions does not in any way affect the operability of the invention.

The 200 main graphs and their variants (in parenthesis) of Table 1 follow in UNICODE format: 一; 口; 亻 (乙(乚,乛,𠃌,ㄥ); ヽ); 人; 勹; 日; 白; 手(扌), a1, 土; 辶; 刀(𠂊,刂); 丨; 木; 水(氵,氺); 扌; (青); 月; 扌; 丶(丷, ㇀); 丷; 亠; 戈(弋); 女; 心(忄, 㣺); 大; 宀; 卜; 厶; 二; 上; 力; 丁; 纟(糸); 辶; 寸; 日; 阝; 八; 又; 禾; 王; 己; 丷(丬); a2; 冂; 子; 立; 山; 凵; 门; 夕; 米; 厂; 文; 乚; 廿; 丁; 少(老); 攵; a3; 羊(丷); 甲; 户; 止; 小; 贝; 儿; 冖; 皿; 至; 匚; 广; 见; 火(灬); 斤; 亍; 西(覀); 车; 匕; 示(礻); 艮; 山; 牛; 豕; 癶; 犬(犭); 宀; 𠮷; 玉; 走; 卝; 井; 阝(㔾); 彐(㠯); 金; (钅); 义; 爿(丬, 刂); 弓; 青; 隹; 户; 用; 舌; 自; 山; 氏; 儿(足); 页; 衣(衤); 音; 长; 行; 穴; 石; 干; 矢; 而; 长; 欠; 月(肉); 爫(爪); 马; 首; 而; 父; 廴; 彡; 角; 皮; 高; 匚; 比; 聿(聿); 无; 歹; 皿; 非; 身; 虫; 支; 雨; 斗; 罒 (网); 疒; 川(巛); 气; 饣(食); 齐; 入; 卯; 酉; 舟; 片; 牙; 采; 谷; 革; 风; 尢; 豆; 亠; 出; 幺; 韦; 鸟; 毛; 黑; 辛; 麻; 玄; 角; 羽; 走; 龙; 白; 飞; 鬼; 缶; 黄; 高; 辰; 骨; 𦊆; 彡; 香; 矛; 瓜; 末; 瓦; 齿; 豸; 肉; 舛. Symbols a1, a2, and a3 denote graphs unrepresented in UNICODE. Symbol a1 indicates a first (upper-left) graph of character 左, as shown in line 9 of Table 1. Symbol a2 indicates a first (upper) graph of character 乞, as shown in line 45 of Table 1. Symbol a3 indicates a first (two central vertical strokes) graph of character 业, as shown in line 61 of Table 1.

Character decomposition rules in the present input method, or in the generation of description of characters in the characters description table of the present invention, are extremely simple in comparison with conventional structural coding methods and are as follows.

1. A direction of decomposition from top left to right down, for enclosing graphs (i.e. those in which other graphs are disposed inside)—from outside to inside. For example, character 国 is described by the sequence of graphs 口 and 玉.

2. In a case of decomposition ambiguity, a priority is given to a variant with fewer graphs. For example, character 喜 can be described by two sequences of graphs: "十豆口" and "士口丷一口"; according to this rule, the first variant is preferable.

3. All collisions of decomposition are resolved by adding to the description of one of the characters, collision participants, an "empty" modifier graph denoted by "*" symbol. ("The collision" means a situation where it is not possible to obtain, as a result of decomposition, a unique sequence of graphs, that is, two or more characters have the same sequence of graphs.) As an example, consider characters 员 and 呗, whose sequence of graphs is the same: 口 and 贝 (see Table 2 below, which is a part of the compiled characters table and shows, as an example, description for 23 characters). To avoid ambiguity in such cases, empty modifier "*", which is not a part of the graphical image of character, is added at the end of the complete sequence of graphs of the rarer character (the frequency of use of characters can be taken from the Lancaster corpus by R. Xiao). This empty graph is added to the character description to ensure uniqueness of the sequence of its graphs. The sequence of graphs of the more frequent character 员 (yuán) will be represented by line "口贝", and the rarer character 呗 (bei) by the line "口贝 *" (note: "rarer"—this is important for speeding up the input of real texts, therefore, the more frequently used characters are inputted faster and remembered easier). The same modifier graph "*" is used in the present invention for resolving other collisions as well, for example, for distinguishing characters 鸟 (niǎo) and 乌 (wū), whose sequence of graphs will accordingly look like "鸟" and "乌*", since character 乌 (wū) is used less often. The modifier graph does not have its own graphic image in the character structure, but it fixes visual distinction between the two characters, as shown in both examples. It shall be understood that any other sign or special symbol other than the aforementioned "*" may be used as the modifier graph.

TABLE 2

Example of description of 23 characters in the characters description table compiled by the author of the present invention for use in the input method according to the present invention.

| | a character | a sequence of graphs | a marker |
|---|---|---|---|
| 1 | ..... | ..... | ..... |
| 2 | ..... | ..... | ..... |
| 3 | 三 | 一二 | 一二 |
| 4 | 丑 | 二丨一 | 二丨一 |
| 5 | 不 | 一丿丶 | 一丿丶 |
| 6 | 业 | 丨丨一 | 丨丨一 |
| 7 | 夺 | 一二乙丶 | 一二 |
| 8 | 我 | 手戈 | 手戈 |
| 9 | 鹅 | 手戈鸟 | 手鸟 |
| 10 | 国 | 口玉 | 口玉 |
| 11 | 鸟 | 鸟 | 鸟 |
| 12 | 乌 | 鸟* | 鸟* |
| 13 | 世 | 乚山一 | 乚山 |
| 14 | 丘 | 斤一 | 斤一 |
| 15 | 丙 | 一人门 | 一人 |
| 16 | 东 | 乚一小 | 乚小 |
| 17 | 丞 | 乙水一 | 乙水 |
| 18 | 丢 | 丿土厶 | 丿土 |
| 19 | 员 | 口贝 | 口贝 |
| 20 | 呗 | 口贝* | 口贝* |
| 21 | 喜 | 十豆口 | 十豆口 |
| 22 | 暖 | 日⺍一手又 | 日⺍一 |
| 23 | 暧 | 日⺍一手又 | 日⺍一 |

The described decomposition rules allowed constructing, for each character of the considered set of the most frequently used characters, unique graph sequences that unambiguously describe each character, and thus compiling a characters description table, the part of which is shown above in Table 2 for 23 characters. The one-to-one correspondence of character and its description with sequence of graphs ensures unambiguous identification of any character from the set above. Upon successively inputting graphs of a particular character, the user will eventually receive, after query to this table, a single character corresponding to this sequence of graphs. Analysis of the sequence of graphs revealed that for unambiguous identification of a character, input of the complete sequence of graphs is redundant, i.e. a unique character can be obtained at a lower cost. At the same time, the author developed an algorithm for identifying characters from the inputted graphs. As the graphs are being inputted, the algorithm extracts characters from the characters description table and analyzes the inputted graphs in the following order:

1) one inputted graph is considered to be the first graph of the complete sequence of graphs;
2) two inputted graphs are considered sequentially as:
    a) first and last graphs of the complete sequence of graphs or
    b) first and second graphs of the complete sequence of graphs;
3) three inputted graphs are considered as:
    a) first, second and last graphs of the complete sequence of graphs or
    b) first, second and third graphs of the complete sequence of graphs;
4) four inputted graphs are considered as first, second, last and next to last graphs of the complete sequence of graphs.

Analysis of variants in this sequence allows unambiguous identification of all characters from the plurality considered in this way. The algorithm is constructed such that it returns a list of characters, in which the first position of the list is occupied by a character strictly corresponding to the inputted graphs, followed by characters similar to the first one in the graph composition, but requiring the input of additional graphs for identification uniqueness. Thus, the graph returned in the list of characters in the first position will be considered the uniquely identified character in a given set of graphs. As a result of analysis of operation of this algorithm, it was found that to uniquely identify almost all characters consisting of more than three graphs, with the exception of 42, it is sufficient to take into account only the first, second and last graphs of their complete sequence. These sequences for each such character will be called fsl-sequences (from "first, second, last"), accordingly, the algorithm for isolating these sequences will be conditionally called fsl-algorithm. Among other things, "fsl" ("first, second, last") is a good mnemonics for the user, especially at the initial stage of training, which allows inputting unfamiliar character without knowing its marker yet ("markers" will be described in detail below in the context of selection modes [0040]; by way of example, markers for 23 characters are presented in the last column of Table 2 above).

The importance of fsl-sequences in the identification of characters is hardly accidental. The development of hieroglyphics has been going on for centuries, and the experience of many generations in remembering and using characters has led to the fact that the general structure of characters as complex graphic images has been gradually, implicitly and unconsciously brought into conformity with the natural laws of perception and recognition of complex graphic images: holistic coverage of image, division of it into components, transition from outside to inside.749ception, selection of the first and last component of a graphic image seems quite natural. This is also confirmed by the fact that there are characters (40 characters of the 42 characters mentioned above) that cannot be identified by three graphs and are identified only by four: first, second, next to last and last, as if embracing the perimeter of the character and passing inside it. If distinctions between structures of two characters (in fact, two graphic images) are concentrated in their very center, then it is not possible to "get" to them through the description with the aid of the first, second and last graphs.

The two remaining of the 42 characters: 暖 and 暧, each consisting of 5 graphs (日⺍一手又 and 日⺍一手叉), differ only in the central (third) graph and they are identified only by the first, second and third graphs. It is also quite natural, when recognizing complex graphic images, to identify and fix certain "tokens", "markers" specific to these images and allowing them to be identified without paying attention to the remaining details, "insignificant" from this point of view. From these considerations, an additional analysis of fsl-sequences was carried out. It was noticed that selection of characters by the fsl-algorithm often "responses" earlier, after inputting only two graphs: the first and second or the first and last, i.e. there is information redundancy as well, which can be eliminated. On the basis of the "early response" of the fsl-algorithm for each character, after a mandatory check for uniqueness, a minimal sequence of graphs was found that preserves the one-to-one correspondence with the corresponding character, its marker. Since, in most cases, the fsl-algorithm responses on the maximum on three graphs, the size of markers also does not exceed three graphs. For the above characters, which are identified by the fsl-algorithm only by four graphs, the author also succeeded in forming markers of three graphs. Thus, for all characters of the set under consideration, markers with a size of no more than three graphs were generated, which allowed organizing input of characters of said plurality using no more than three manipulations. It should be noted that markers of all characters in the first position always include the first graph of the complete sequence of graphs. The second marker graph is either the second or last graph of the complete sequence. The third marker graph is almost always the last graph of the complete sequence, and only nine characters have the third marker graph being the third graph of the complete sequence. That is why memorizing markers for each character is not difficult for the user. The latter is the additional advantage of using the present invention.

According to the present invention, 72.5% of all characters have markers consisting of one or two graphs. And this means that in the process of inputting, 72.5% characters are uniquely identified after specifying two graphs only, i.e. two user manipulations are sufficient for their identification. If we take into account the frequency of use of these characters in real texts, it turns out that in 80% of cases when inputting the average text, only two manipulations are needed to identify the character. None of the prior art methods can provide such a result. Also, none of the prior art input methods uses the idea of extracting markers as characteristic components of graphical image of characters, and using them to speed up the input of characters.

When characters are inputted according to the present method, selection of the character corresponding to the graphs inputted by the user is performed from the characters description table in accordance with the selection mode preset by the user. Since the characters description table stores information about the complete sequence of graphs for each character, the method can use different selection modes depending on the task or the user's level of training. In general, this method allows selecting characters from any conceivable combination of graphs. However, preferred embodiments of the present invention include the following selection modes:

"Free mode" is a mode of selecting all characters, in which the graphs inputted by the user are met in any order. The mode can be used to input a character unknown to the user, for example, from a paper document, to search it in a dictionary or to get reference information on the composition of graphs or the marker of the needed character (see description of virtual keyboard below). Having determined several graphs of the desired character, the user enters them, and visually finds the desired character in the returned list of characters.

"Sequential mode" is a mode of selecting characters, in which the user-inputted graphs appear in the sequence of graphs of characters one after another and not necessarily from the beginning of character; the mode is useful for searching "by analogy" characters having common graph blocks that can also act as separate characters, which, among other things, allow tracking the inclusion of simple characters in more complex ones. Isolation of similar components of characters is a useful procedure; it facilitates memorizing characters and is traditionally widely used in teaching hieroglyphics.

"Fsl-mode" is a mode of selecting characters, where the system interprets 3 graphs inputted by the user as the first, second and last graphs of the desired character, as described above. It is a very useful way of quick input, if the user at the initial stage of learning still does not remember the markers. This mode allows identifying the majority of characters (69% or 2987) after inputting no more than two graphs and almost all (except for 40 characters) after three graphs inputted. To enter the remaining 40 characters, it suffices to add the next to last graph of the complete sequence to the three inputted graphs, as described above. As to the 2 characters (暖 and 暧) described above, they are inputted in this mode by their first, second and third graphs.

"Marker-based mode" is a mode of selecting characters, where the system interprets the graphs inputted by the user as marker graphs and returns characters containing the inputted graphs in the order specified in the markers of the characters description table. This is the fastest input mode. As mentioned above, 80% of characters of the average statistical text in modern Chinese are identified in this mode just after two manipulations.

Marker-based input offers the user some more advantages. At marker-based input, the aforementioned input complete flag can be tracked. It is necessary to recall that in all characters input methods the input procedure as such is divided into 2 stages.

1. Process of identification of the desired character by some user inputted parameters, and presentation of the same to the user for input, and in case of uncertainty, formation of a list of candidate characters and provision to the user for selecting the needed character.

2. Actual input of the desired candidate character into the input focus of a program waiting for input from the keyboard (performed by the user "manually", by separate manipulation).

At the marker-based input, in response to inputting a first graph by the user the system returns a list of characters, in which the first character is that, whose marker either consists of the single inputted graph, or begins with the inputted graph. If the returned list contains only one character, then no graphs are to be inputted further. Otherwise, after inputting a second graph, the only character in the returned list will be the same. After inputting a third graph, if it was possible, it is already pointless to continue inputting, because there are no markers larger than three graphs in this version of composite input. The size of the returned list consisting of one character is precisely the input complete flag, which can be automatically detected and used in the input algorithm. After such detection, the second stage of the traditional procedure involving the user becomes meaningless, it can be omitted, because according to the present invention the obtained character can be sent directly to the input focus of the program waiting for input from the keyboard, automatically (i.e. responsive to the detection of the input complete flag, which will be further described below). In the marker-based process, the input of 93.2% of characters ends upon detecting the input complete flag. In other words, in 93.2% of cases the composite input method increases the speed of input owing to elimination of one manipulation. In the remaining 6.8% of cases, when the potential input of graphs is still possible in principle, but the needed character is already presented in the returned list in the first position, the user may send it to the program input focus of the program waiting for input from the keyboard by a separate manipulation.

Figure 10:
FIG. 10 shows locking of keys on the reduced virtual keyboard after inputting the first graph (step S908).

Second advantage of the marker-based input is that after inputting the next graph in this mode, it is very simple to compute, using the characters description table, the set of marker graphs possible (or "allowed") for subsequent input and, thus, exclude those combinations of graphs that do not occur in the markers and, as a result, return an empty list of characters. To do this, it is sufficient to select in the characters description table those marker graphs that occur in the next marker position after that inputted for characters from the list of characters returned by the system at the previous stage. Then, according to an embodiment of the present invention, the remaining graphs not included in the resulting list can be locked on the matrix of graphs or switched to idle mode (as shown in FIG. 10). This key lock mode not only allows getting rid of some amount of mechanical errors, but also makes it easier to master the method, giving the user a visual hint of possible options directly at the time of input. This is an additional advantage of using the present invention.

Finally, the third advantage is that the use of the present input method in early stages of training contributes to better memorization of characters. While the structural coding methods with their complex decomposition rules can be applied only after the character is already "known", i.e. can be easily differentiated from others and its structure is already fixed in memory, the present input method enables writing characters at the first stages of training, which just helps to understand and remember the structure of the character as such.

Since according to R. Xiao a little more than half (about 54.4%) of the words of modern Chinese are two-, three- and multisyllabic (i.e. consist of several characters in writing), there are reasons to provide the user with the opportunity to enter immediately multisyllabic words beginning with the user inputted character. Such a predictive input can be implemented in an embodiment of the present invention by adding to the system a table of polysyllabic words with indication of frequency of their use in the language and their use counter. The counter can be configured to record the number of entries of a particular word by the user. Then the system will be able to present firstly to the user for input, by his choice, either the words most often encountered in the language, or the words mostly often used by the user.

System for Input of Characters. Keyboard for Input Characters.

Characters input system can be implemented for all possible platforms (e.g., but not limited to, Linux, Windows, iOS, Android, BlackBerry OS). It may comprise a user device and a virtual keyboard implemented therein according to the present invention. Alternatively, the system may comprise a user device and a connected hardware keyboard according to the present invention. The user device may be, but is not limited to, a PC, tablet, smartphone, or the like. The hardware keyboard can be connected to the user device through a wireless (Bluetooth, for example) or wired (USB, PS/2, for example) interface. The hardware keyboard can be implemented in accordance with known technologies such as membrane, dome, rubber, rubber-membrane, capacitive, mechanical, magnetic, projection, optical (photoelectric) keyboard. A virtual keyboard can be implemented as on-screen keyboard.

Figure 7:
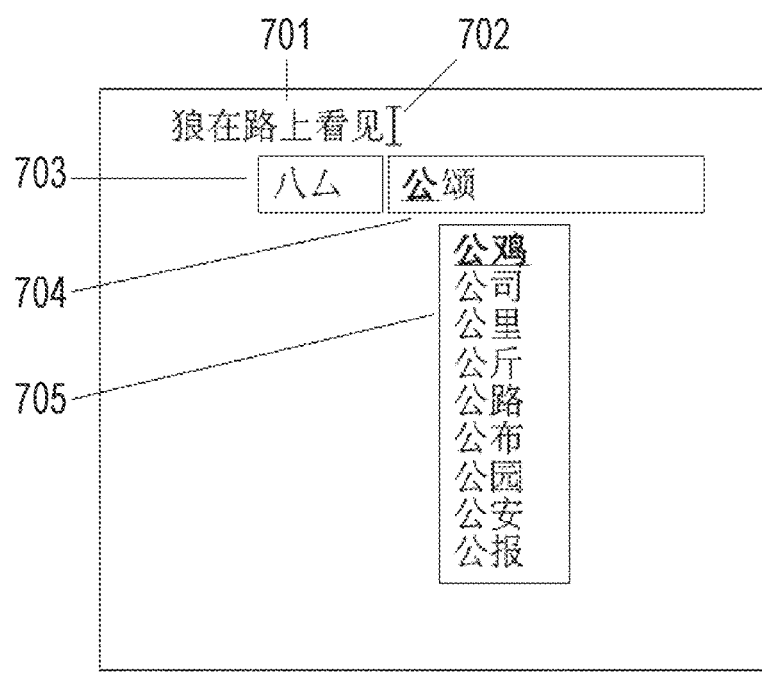
FIG. 7 is an area of the screen of the user device during input of characters using a hardware keyboard.

FIG. 1 shows a general logical diagram of a system for inputting characters. Generally, the system may comprise a user device (102) and a keyboard disclosed herein, which can be implemented either as a separate hardware keyboard (101) or as a virtual (on-screen) keyboard (107). In FIG. 1, a separate hardware keyboard (101) and a virtual keyboard (107) are shown simultaneously. It is understood that in other embodiments the system may comprise only one keyboard, either a separate hardware keyboard (101) or a virtual or on-screen keyboard (107). The user device (102) may comprise a screen (103), a data storage unit (104), a processing unit (105), an input device (106), a on-screen keyboard (107), a graphs area (108), a characters area (109), a words area (110), and input focus (111) of a program waiting for input from the keyboard. The keyboard (101 or 107) comprises a set of graph keys (not shown in FIG. 1), each key being configured to input a separate graph from a set of graphs, a set of punctuation and number input keys (not shown in FIG. 1) forming a punctuation and numeric board, and a set of control keys (not shown in FIG. 1). The user device processing unit (105) can be configured to generate an on-screen keyboard (107), receive a signal(s) from the keyboard (hardware or virtual), generate queries to tables and sets that are used in the present invention and can be stored in a data storage unit (104) disposed in memory (ROM or RAM) of the user device (102), send (output) the results of these queries to the user device screen (103), generate and display, as needed, corresponding lists in the graphs area (108), the characters area (109), the words area (110) and, ultimately, send the user-requested character or word to the input focus (111) of the program waiting for input from the keyboard. The data storage unit (104) can store instructions for implementing the steps of the method of inputting simplified Chinese characters, disclosed in the present application. The processing unit (105) can be configured to read these instructions from the data storage unit (104) to perform the steps of the method of inputting simplified Chinese characters, disclosed in the present application. Also, the processing unit (105) can be implemented such that it will be able to interact with any other input device (106) of the user device, for example, with a standard alphanumeric keyboard, with any positioning device (mouse, trackball). An example of the screen area (103) of the user device (102) during operation of the system is shown in FIG. 7. There are shown the input focus (701) of the program waiting for keyboard input with a text cursor (702) indicating the next input position in the text line, the graphs area (703), the characters area (704) and the words area (705). It will be appreciated that the arrangement of the aforementioned screen areas is not necessarily as shown for illustration in FIG. 7. In addition, if the function of predictive input of the polysyllabic words is disabled, the words area (705) may not be displayed on the screen or be inactive. The input method will be described in detail below.

Layout of graphs on the keyboard was developed by the author on the basis of data on the occurrence of characters in modern Chinese texts (R. Xiao, see the reference above). The occurrence frequency of graphs in the first two marker positions was calculated for all characters from the above characters table. The graphs are disposed on keys in order of decreasing occurrence frequency from center to periphery (see FIG. 2). It was found that the first 100 graphs (Table 1) by the occurrence frequency provide input of 90.48% of characters. In other words, these 100 graphs are enough to enter 90.48% of characters. This is important because it allows the use of the keyboard for input on portable devices with a small-size screen, showing the user only the first (main) half of the set of graphs, and calling the second (right side of FIG. 3) with a separate control key only if necessary. Such a reduced keyboard can be used as an on-screen keyboard on portable user devices for input with one hand, when the other hand holds the device itself.

Virtual keyboard can be implemented, depending on the screen size of the device on which it is implemented, in three form factors:

1) Full-size keyboard comprising in expanded form 10 rows of 20 keys each (20×10) for desktops, laptops and tablets with a screen from 10 inches and higher (FIG. 2). A full-size keyboard is designed to enter characters both with one hand and two as with a conventional keyboard.

2) Reduced keyboard comprising a set of keys on 10 rows of 10 keys each (10×10), for user devices with a screen of 6 to 10 inches (FIG. 3). By default, the keys in the initial state encode the first half of the set of graphs, arranged on the keys according to the occurrence frequency from center to periphery, and by pressing a separate control key the keyboard is switched to the alternative state, in which the first part of the set of graphs is replaced by its second part, and the same keys serve to input graphs from the second half of the set of graphs, which are also arranged on the keys according to the occurrence frequency from center to periphery. In this embodiment, the keyboard is configured to automatically switch back to the initial state in response to inputting the next graph from the second half of the set or in response to the next pressing of the same control key. This enables quite quick input of any graph(s) from the entire set of 200 graphs. The expected loss of about 10% in performance due to the need for additional manipulation by pressing the control key for switching the keyboard to an alternative state is not too big cost for the ability to work on a mobile device.

3) Compact keyboard comprising a set of keys on 5 rows of 10 keys (10×5), designed for user devices with a screen less than 6 inches (FIG. 4). In this embodiment, the keys also encode only one half of the set of graphs, and a separate control key is used to switch to the alternate state. Each key simultaneously encodes two graphs of the respective part of the set of graphs: one press enters the first graph, second press—the second, delay of first press repeats input of the first graph, delay of second press repeats input of the second graph. The graph keys on such a device are not smaller than buttons of a standard virtual QWERTY keyboard, although it will occupy a bit more space on the screen, because it has 2 more rows of buttons. It is understood that the input speed on such a compact keyboard will be lower than, for example, on full-scale, but the skill acquired by the user when inputting characters on the full-sized keyboard of the present invention will improve the input efficiency in this embodiment as well.

Figure 5:
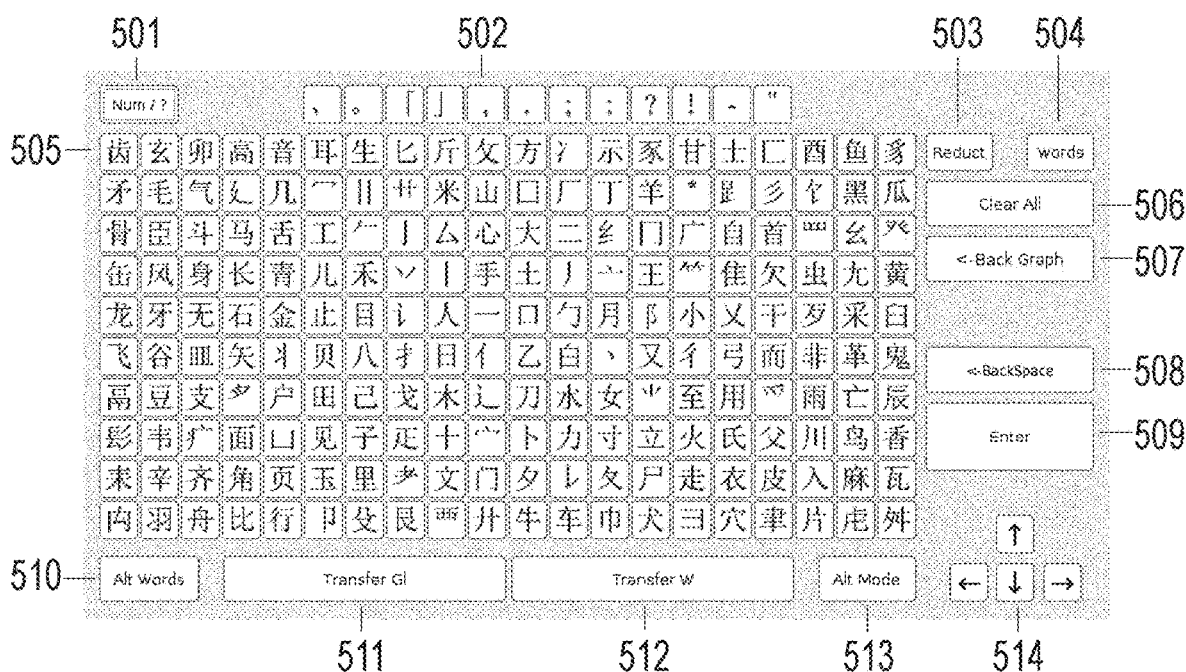
FIG. 5 is a hardware keyboard for inputting characters with a full set of keys.
Figure 6:
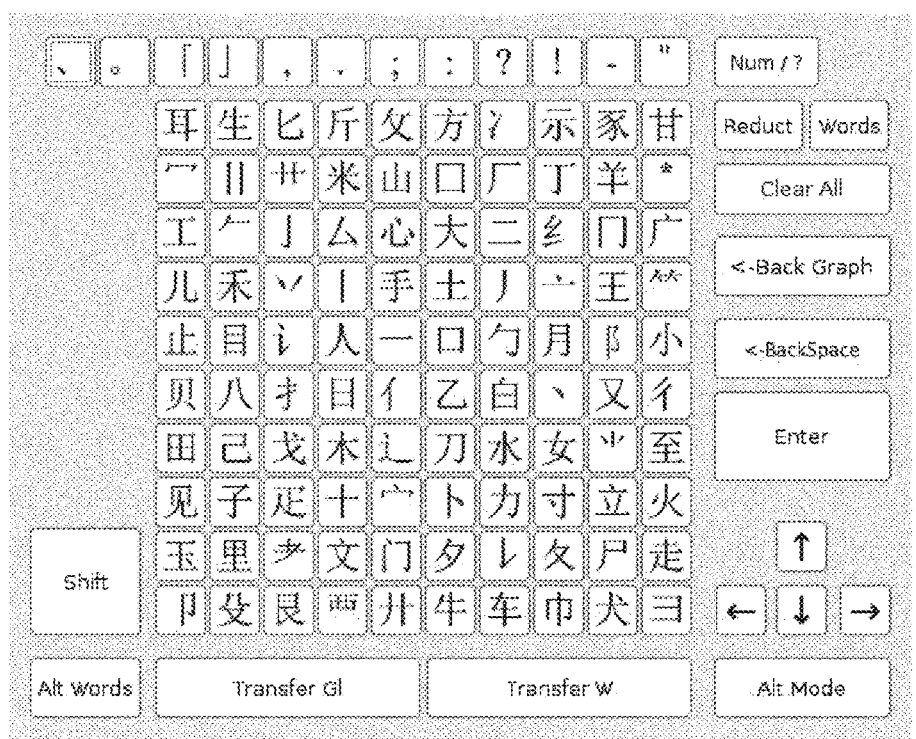
FIG. 6 is a hardware keyboard with a reduced set of keys.

Hardware keyboard may be implemented in the first two of the described form factors: 1) and 2) (see FIGS. 5 and 6). Reduced hardware keyboard may comprise a control key intended for replacing the first half of the graph matrix by the second one and vice versa and acting like a common Shift key on the standard keyboard: while it is pressed, the second half of the set of graphs is activated upon releasing it the first half of the set is activated again.

Figure 8:
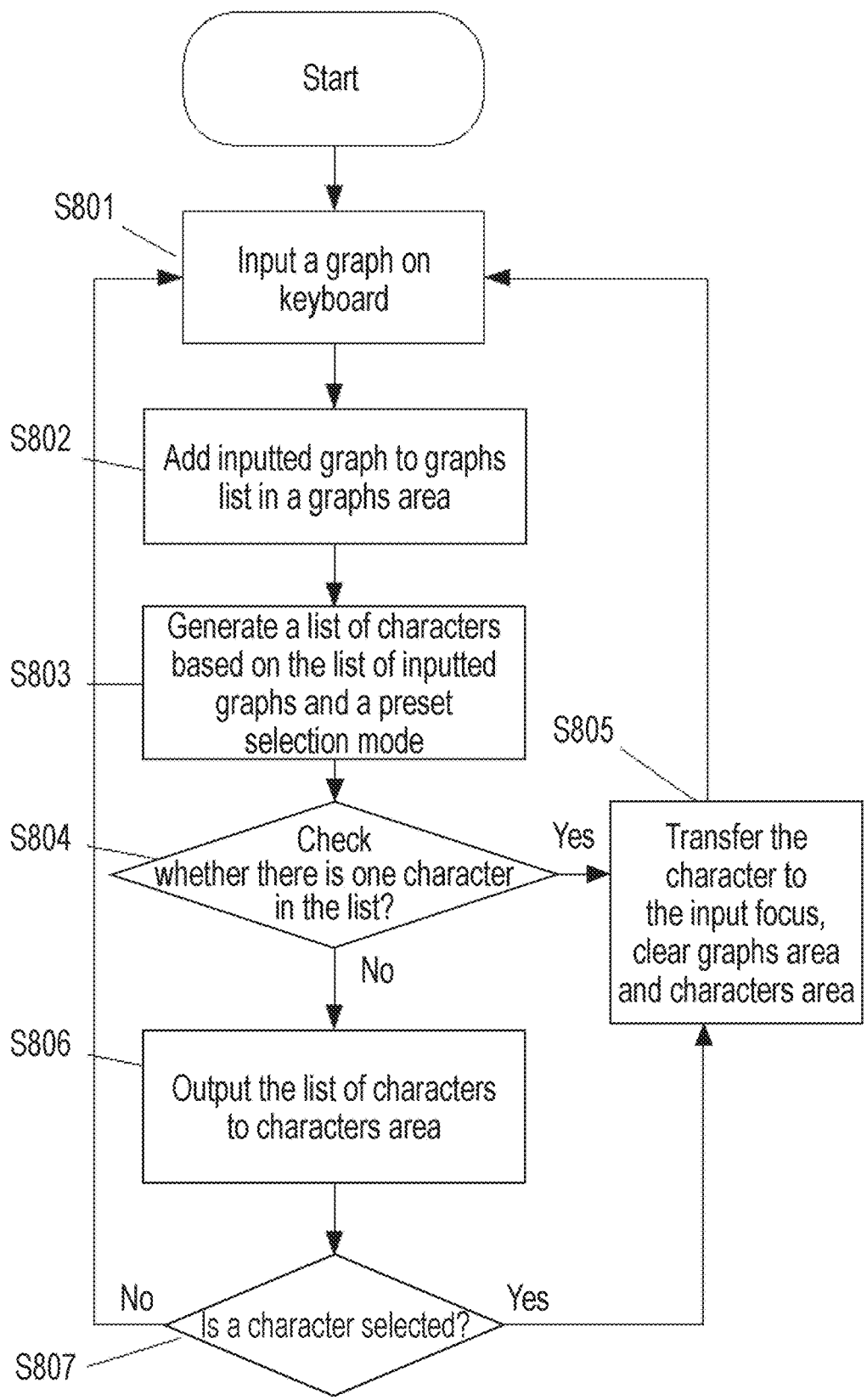
FIG. 8 is a flowchart of a method of inputting characters. General flowchart for all selection modes except for marker-based selection with locking of keys (option 1).

One of possible embodiments of the input method will be considered using an example of a full-size hardware keyboard (FIG. 5). All the selection modes, except the marker-based selection, access the full sequence of graphs and work in a similar way; FIG. 8 shows a flowchart of the described method. First, consider the situation when Words switch button (504) is disabled, i.e. input will be performed by separate characters and the function of predictive input of polysyllabic words will not be used. The user inputs (S801) by pressing the corresponding key of the graph he needs in the graph keys block (505) on the keyboard. The system displays (S802) the specified graph in the graphs area (703) of the user device screen, adding it to the end of the graphs list. It is clear that after inputting the first graph and executing step S802, the list of graphs will consist of the single graph. Further, depending on one of the set characters selection modes from those described above (in this embodiment this can be done on the keyboard with Alt Mode button (513), which switches the selection modes in the specified order and the activated mode is displayed in the notification area on the screen of the user device), and based on the list of user inputted graphs, the system generates (S803) a list of characters. In the next step (S804), the size of the list of characters is checked. If the list of characters consists of only one character (Yes in step S804), then it is uniquely identified and the input complete flag is detected; this character is transferred (S805) to the input focus of the program waiting for input from the keyboard, and graphs area (703) and characters area (704) are cleared; the method is waiting for input of next graph to input next character. If the list of characters consists of more than one character (No in step S804), this list is displayed (S806) in characters area (704). Then, the needed character can be selected in the list of characters (S807). This input method can be implemented so that the first position of the list of characters (a first position in characters area (704), in which the character can be underlined) is active and may have a special designation to transfer characters from this position to the input focus. A character from the active position of the characters area can be sent to the input focus by any specially reserved key (Transfer Gl (511) in the embodiment shown in FIG. 5), including the keys of a standard alphanumeric keyboard, if connected to the input receiving device, or any mouse button not used as a pointer, or by any other method designed to transfer the first character from the characters area to the input focus. Transfer of the active position of the characters list can be done using the horizontal direction arrow keys of the block 514 with arrows. This allows selecting any character from the list in the characters area to transfer it to the input focus without leaving the keyboard. It is clear that selection of character in the list can be also done by pointing it with finger or stylus on the touch screen or by clicking the mouse. Also, in this embodiment of the present input method, it may be possible to transfer character from the active position of the characters area to the input focus by pressing any key from punctuation and numeric keys block (502). In this case, character is transferred to the input focus, and a corresponding punctuation mark is placed after it. The characters area (704) can be configured to scroll the entire list of characters, if it cannot be placed entirely in the screen space allocated to it. If a character is selected by one or other of the above methods in this step, it is transferred to the input focus; the characters area and the graphs area are cleared (S805), the system returns to graph input step (S801) to input next character. If a character is not selected in this step, the process proceeds to next graph input (S801). In this embodiment of the present input method, the step S806 can be moved to the position immediately after step S803. This does not violate the working capacity of the method, although it leads to a meaningless output of the list of characters, if it contains a single character.

Figure 11:
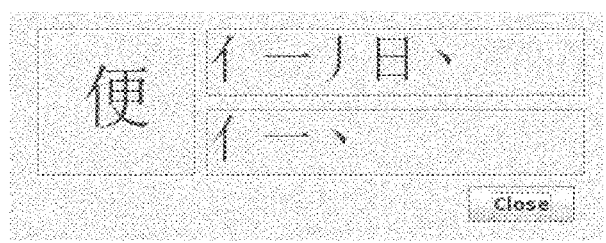
FIG. 11 is an information window for assistance on the composition of character.

FIG. 5 shows additionally the keys: Clear All (506), which is configured to clear the graphs area and the characters area; BackSpace (508), which is configured to delete the last symbol in the input focus of the program waiting for input from the keyboard; and Enter (509), which is configured to translate the line in the input focus of the program waiting for keyboard input. Pressing the Num/? switch key (501) changes the encoding of punctuation keys (502) so that they encode not punctuation marks, but numbers, and can also switch on the prompt mode. Both punctuation marks and numbers are inputted directly to the input focus, and the prompt mode works as follows. As mentioned earlier, the system is user friendly and does not expect from her/him to do impossible. Encountering an unfamiliar character, the user, without recalling the complicated decomposition rules, notes that the character has in its composition, for example, graph "亻" and graph "口", switches the characters selection mode with Alt Mode switch key (513) to free selection, and successively inputs the graphs "亻" and "口". In response to the input, the system returns in the characters area (704) a list of 10 characters containing these graphs: 㕮, 便, 借, 仲, 㐷, 㐸, 鞭, 僧, 佗, 僚, among which the user can easily find the character he needs. Now the user should press Num/? switch key (501), and click on the desired character, for example, or touch it with finger or stylus on the touch screen. With the Num/? key pressed the system does not send the character to the input focus, but displays an additional window (FIG. 11), which shows the composition of graphs of the user selected character and its marker—all information about characters is stored in the system and is available to the user at any time.

Figure 9:
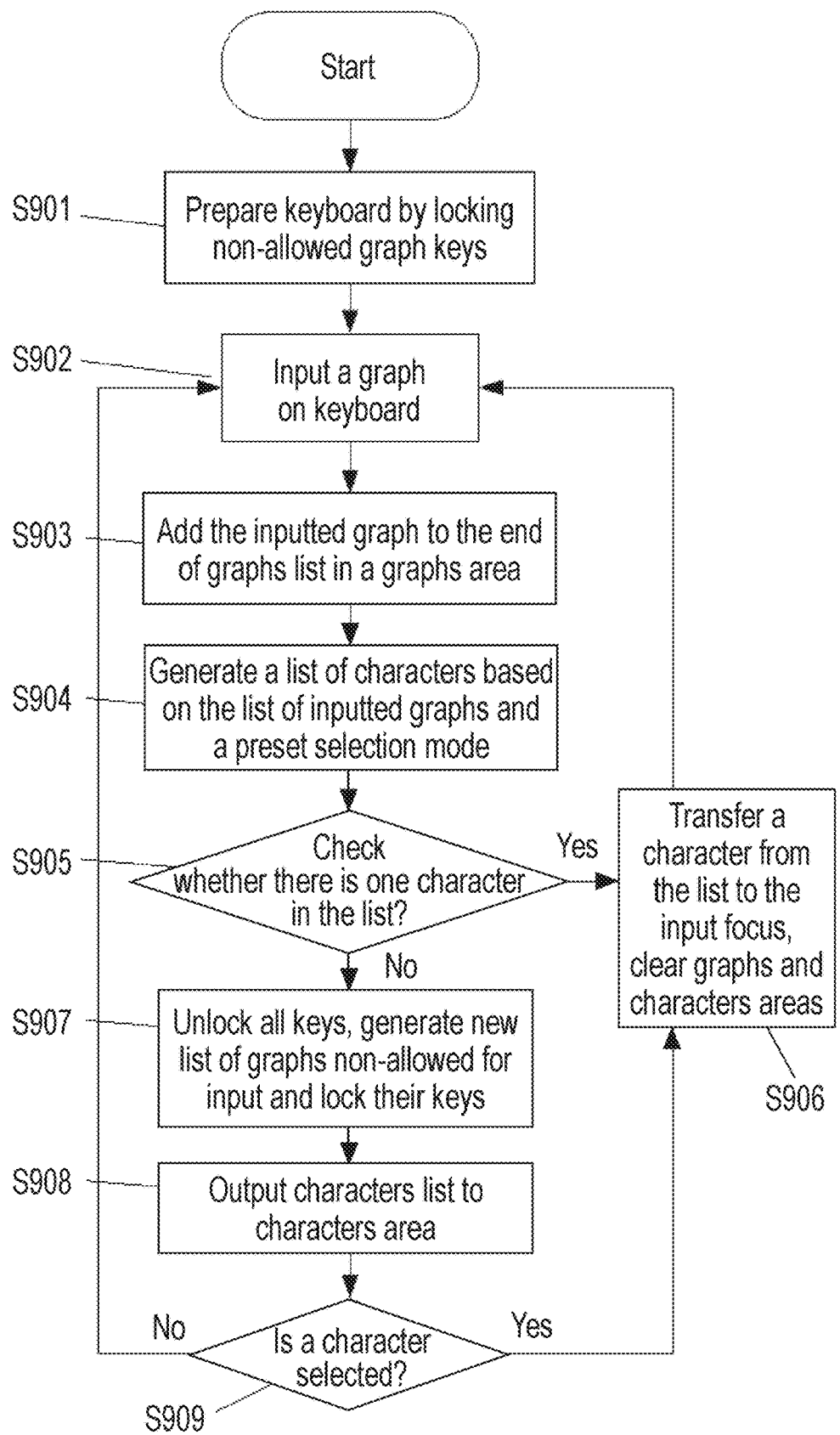
FIG. 9 is a flowchart of a method for marker-based input of characters with locking of keys (option 2).

Implementation of the input method described below with marker-based selection of characters (see FIG. 9) differs somewhat from the previous implementation of the method (see FIG. 8). When Reduct key lock switch (503, FIG. 5) is turned on, the graph keys are prepared in step S901. Since the graphs 夂, *, 殳, 豕, 内 and 舛 never occur in the first position of the marker, the keys encoding them on the keyboard are locked. Then everything proceeds in the same way as in the previous embodiment, including step S904: pressing the necessary graph key on the keyboard (S902), displaying the inputted graph in the graphs area 703 (S903), forming the list of characters (S904). Next, the check is made for the input complete flag, and if it is detected, i.e. a single character is returned (S905), this single character is sent to the input focus, while the graphs area and the characters area are cleared (step S906), and if there are more than one characters in the list, this means that the list of characters should be output in the characters area (step S908). First, in step S907, all the graphs keys on the keyboard are unlocked, and a new list is formed of graphs that are valid for subsequent input; to this end, for all characters listed in the list of characters, graphs are selected in their marker position greater by one than the graphs inputted (for example, if 1 graph was inputted, graphs of the second marker position are to be selected). After that, keys of those graphs that are not present in the resulting list are locked. Steps (S907) and (S908) can be interchanged, and this will not affect the operability of the method. After this (S909), the user is given the opportunity, as in the previous embodiment, to select character or go to the next graph entry step (S902). The keyboard has already been prepared for inputting next graph in step 5907.

Now describe the opportunities of the polysyllabic words input mode, which is switched on by Words switch key (504). When the Words key is pressed after inputting each graph, the system accesses the table of polysyllabic words, and selects from this table words that begin from the first character in the list of suggested characters in characters area (704), and displays them in words area (705). The words in this list are arranged in order of decreasing frequency of their use. To transfer an active most frequently used word (i.e. the first word in the list, underlined as in the characters area) to the input focus it is sufficient just to press Transfer W key (512), or if the user does not need the first word from this list, he can select it by shifting the activity label with the vertical direction arrow keys of the block 514, and send it to the input focus by any convenient manipulation: by pressing Transfer W key (512) or by clicking on the desired word, or by touching the touch screen with finger (or stylus). Also, similarly to the above method of inputting individual characters, punctuation keys (502) can transmit the first word from words area (705) directly to the input focus with an insert of the punctuation mark after the word. Since the list of words can be large enough, the words area (705) can be configured to scroll through its contents. To speed up the search in the list of words, Alt Words key (510) is used. With the Alt Words key pressed, the system perceives the user-inputted graph as the first graph of the second character of the expected word. The system selects from the multisyllabic words table the words that begin with the active character of the list of characters in the characters area (704), and the second character of which begins with the graph inputted when the Alt Words key is pressed. This is usually enough to reduce the list to the observable size. Each operation of transferring a word from the words list to the input focus increments by one the usage counter of this word in the multisyllabic words table. Therefore, this embodiment of the composite input method can be executed such that the user is able to choose in which order multisyllabic words are to be output in the words area (705): either in order of decreasing frequency of their use in the language, or in order of decreasing use by the user.

Keylock mode is a further little benefit from the use of information about the real composition of characters instead of the conditional letter codes. This mode is used together with the marker-based input as described above. After each inputted graph, the system analyzes which graphs can be inputted in the next input step, and locks on the keyboard the keys of those graphs whose input is meaningless. FIG. 10 shows, on the example of a reduced keyboard, the key lock after inputting two graphs "人". On the keyboard, only the keys of those graphs that are actually present in the markers beginning with the graph already inputted are left active. This reduces the number of input errors, especially on small screens, and gives an implicit hint to a new user having insufficient skill to prevent him from incorrect actions.

Although the present invention has been described with a certain degree of detail, it shall be appreciated that the present disclosure has been made only as an illustration and that numerous modifications can be made in the details of the structures, the arrangement of parts of the disclosed systems and keyboards for inputting characters or steps of the method for inputting characters without going out of the scope of the invention, which is defined by the following claims.

The invention claimed is:

1. A method of inputting characters, comprising:
 selecting a graph from a set of graphs that is a part of a character to be inputted;

including the selected graph into a list of graphs and displaying the list of graphs in a graphs area;

forming a list of characters containing the selected graph by selecting the list of characters from a characters description table based on the list of graphs; and based on a preset character selection mode:
- if there is only one character in the list of characters, automatically transferring the one character from the list of characters to an input focus of a program waiting for input, clearing the list of graphs and the list of characters, and selecting a graph to input a next character; and
- if there is more than one character in the list of characters, displaying the list of characters on a screen, wherein:
  - if a character to be inputted is in a first position of the list of characters, transferring the character from the list of characters to the input focus of the program waiting for input, clearing the list of graphs and the list of characters, and selecting a graph to input a next character; and
  - if the character to be inputted is not in the first position of the list of characters, selecting a next graph, which is a part of the character to be inputted, or selecting the character to be inputted in the displayed list of characters and transferring the character from the list of characters to the input focus of the program waiting for input, clearing the list of graphs and the list of characters, and selecting a graph to input a next character.

2. The method of inputting characters according to claim 1, wherein the set of graphs comprises the following 200 graphs:

一丨丩亅乙乚乛丿 , 丶人乂日白手户 , a10;
土丄刀(勹刂); 上凵水 ( 氵辶月扌丷 (
丶丷丷兰六戈(弋)女 , 心(忄灬)大宀卜; 厶二十力丄 ;
纟(糸)疋寸且匕八 ; 又禾十亠丷(冖) ); a2;
冂子立山口门; 夂米广文乚 ; 艹丁耂(老)攵 ; a3;
羊(芈)里尸止小贝; 彳攵方廾牛(牜) ; 儿灬至工广;
见火(灬)斤爪西(酉) ); 午匕水(氺) 艮巾生 ; 豕及犬(犭)二 ;
*;玉走耳甘廾 ( 彐(彑)金(钅)又斗
小刂)弓青隹户用 ; 舌自山氏几足 (足) 贝衣(衤)齐;
士行穴石干矢而 ; 長欠月(肉)爫(爪)马 ; 首面父夂彡角;
皮高亡比聿( 中)尤歹皿非身虫 ; 支雨斗罒(网)广川
(巛)乀饣(食)齐入 ; 卩西舟片牙 ; 釆谷革風九豆亡 ;
臣幺韦鸟毛黑辛 ; 麻玄鱼羽虍龙 ; 臼飞鬼缶黄;
鬲辰骨疒彡 ; 香矛瓜未瓦 ; 齒多肉列;

wherein:
- variants of some of the 200 graphs are indicated in parentheses;
- symbols a1, a2, and a3 denote graphs unrepresented in UNICODE where a1 indicates a first (upper-left) graph of character 左, a2 indicates a first (upper) graph of character 乞, and a3 indicates a first (two central vertical strokes) graph of character 业; and
- graphs in the set of graphs are arranged in order of decreasing occurrence frequency.

3. The method of inputting characters according to claim 2, wherein the characters description table specifies for each character:

- a complete sequence of constituent graphs of the character that is unique within a plurality of characters included in the characters description table and that uniquely identifies the character among the plurality of characters; and
- a character marker as a minimum sequence of graphs that has a size of one to three graphs and begins from a first graph of the complete sequence of constituent graphs of the character, the character marker preserving a uniqueness within the plurality of characters included in the characters description table and uniquely identifying the character among the plurality of characters.

4. The method of inputting characters according to claim 3, wherein the uniqueness of the complete sequence of constituent graphs of the character in the characters description table is provided by the following decomposition rules:
1) a direction of a decomposition is from left to right and from top to bottom, for enclosing graphs from outside to inside;
2) graphs are indivisible;
3) in a case of an ambiguity of a decomposition, a priority is given to a variant with fewer graphs;
4) a collision at a decomposition for two or more characters is resolved by adding a separate modifier graph to a more rare character in the collision, wherein the separate modifier graph does not have a graphical image but fixes a visual distinction of the character.

5. The method of inputting characters according to claim 1, wherein the preset character selection mode is selected from the group consisting at least of:
- a free mode that comprises selecting all characters from the characters description table in which user selected graphs are met in a complete sequence of constituent graphs in any order;
- a sequential mode that comprises selecting characters from the characters description table in which user selected graphs are met in the complete sequence of constituent graphs in an order of one after another and not necessarily from a beginning of the characters;
- a first, second, last mode that comprises extracting, in the course of selecting graphs, characters from the characters description table and considering the selected graphs in the following order:
  1) one selected graph is considered as a first graph of the complete sequence of constituent graphs;
  2) two selected graphs are considered sequentially as:
     a) first and last graphs of the complete sequence of constituent graphs, or
     b) first and second graphs of the complete sequence of constituent graphs;
  3) three selected graphs are considered as:
     a) first, second, and last graphs of the complete sequence of constituent graphs, or
     b) first, second, and third graphs of the complete sequence of constituent graphs;
  4) four selected graphs are considered as first, second, last, and next to last graphs of the complete sequence of constituent graphs; and
- a marker-based selection mode that comprises selecting characters from the characters description table whose markers in the characters description table contain the selected graphs in strict accordance with an order of the selection.

6. The method of inputting characters according to claim 1, further comprising:
upon forming the list of characters, accessing a polysyllabic words table;

selecting words from the polysyllabic word table that begin with a first character in the list of characters;
forming a list of words from the selected words;
displaying the list of words on a screen; and
selecting a word in the list of words to transfer the word to the input focus of the program waiting for input.

7. A system for inputting Chinese characters, comprising:
a user device;
a hardware keyboard for composite input of simplified Chinese characters on the user device, the hardware keyboard being connected to the user device and configured to interact with the user device, the hardware keyboard comprising: a set of graph keys with each key being configured to input a separate graph from a set of graphs, a set of keys to input punctuation marks and numbers which form a punctuation and numeric board, and a set of control keys; and
wherein the user device comprises:
a data storage unit configured to store instructions for a method of inputting characters and to store the set of graphs, a characters description table, and a polysyllabic words table, wherein the method of inputting characters comprises the step of:
selecting a graph from the set of graphs that is a part of a character to be inputted;
including the selected graph into a list of graphs and displaying the list of graphs in a graphs area;
forming a list of characters containing the selected graph by selecting the list of characters from the characters description table based on the list of graphs; and
based on a preset character selection mode:
if there is only one character in the list of characters, automatically transferring the one character from the list of characters to an input focus of a program waiting for input, clearing the list of graphs and the list of characters, and selecting a graph to input a next character; and
if there is more than one character in the list of characters, displaying the list of characters on a screen, wherein:
if a character to be inputted is in a first position of the list of characters, transferring the character from the list of characters to the input focus of the program waiting for input, clearing the list of graphs and the list of characters, and selecting a graph to input a next character; and
if the character to be inputted is not in the first position of the list of characters, selecting a next graph, which is a part of the character to be inputted, or selecting the character to be inputted in the displayed list of characters and transferring the character from the list of characters to the input focus of the program waiting for input, clearing the list of graphs and the list of characters, and selecting a graph to input a next character;
a processing unit configured to input the character to the input focus of the program waiting for input by receiving one or more user inputs from the set of keys of the hardware keyboard and processing the one or more user inputs in accordance with instructions stored in the data storage unit; and
a screen configured to display the input focus of the program waiting for input, a list of inputted graphs, a list of returned characters, and a list of returned words.

8. The system for inputting Chinese characters according to claim 7, wherein the hardware keyboard is made in one of two form factors:
a full-size 20×10 keyboard; or
a reduced 10×10 keyboard configured to switch parts of the set of graphs assigned to the set of graph keys of the hardware keyboard by hold/release of a key from the set of control keys of the hardware keyboard.

9. The system for inputting Chinese characters according to claim 7, wherein the set of graphs comprises the following 200 graphs:

一; 口; 亻; 乙(乁, し, 」, ), 人; 勹; 日; 自; 手(扌, a1);
土; 士; 刀(⺈, 刂); 上; 丿; 木; 水 ( 氵; 氺; 辶(辵); 月; 扌; 丶 (
丶, し; 丷; 一; 戈(弋); 女 ; 心(忄, 㣺); 大; 宀; 卜; 厶; 三; 工; 力; 丨;
纟(糸); 疋; 小; 甘; 长; 八 ; 又; 禾; 士; 凵; 丷(冖 ); a2;
冂; 亻; 立; 山; 口; 冂; 夕; 米; 广; 文; 匕 ; 廿; 丅; ⺹(老); 夂; a3;
羊(⺷); 里; 尸; 止; 氺; 见; 彳; 攵; 方; 儿; 牛(牜); 儿; 丷; 皿; 至; 匚; 广 ;
见; 火(灬); 斤; 丬; 覀(西); 车; 匕; 礻; 衤; 艮; 冊; 生; 豕; 豸; 犬(犭); 冂; *;
玉; 走; 耳; 廿; 阝 ( 臼; 彐(彑); 金(钅); 父; 礻 (片; 刂); 弓; 青; 隹; 户; 用;
舌; 自; 山; 氏; 几; 星 (足); 页; 衣(衤); 音; 土; 行; 穴; 石; 干; 矢; 而 ;
镸; 欠; 月(肉); 罒(爫); 马; 首; 画; 父; 攵; 彡; 角 ; 皮; 高; 匚; 比; 聿 (
聿; 无; 歹; 皿; 非; 身; 虫 ; 支; 雨; 斗; 罒(网); 广; 川 ; 巛; 气; 饣(食); 齐; 入 ;
卯; 酉; 舟; 片; 乍; 采; 谷; 辛; 风; 儿; 豆; 亡 ;
臣; 幺; 节; 鸟; 毛; 黑; 辛 ; 麻; 玄; 鱼; 羽; 虎; 龙 ;
曰; 飞; 鬼; 缶; 黄 ; 鬲; 辰; 骨; 癶; 髟; 香; 才 ;
瓜; 未; 瓦; 卤; 豸; 肉; 舛 ;

wherein:
variants of some of the 200 graphs are indicated in parentheses;
symbols a1, a2, and a3 denote graphs unrepresented in UNICODE where a1 indicates a first (upper-left) graph of character 左, a2 indicates a first (upper) graph of character 乞, and a3 indicates a first (two central vertical strokes) graph of character 业; and
graphs in the set of graphs are arranged in order of decreasing occurrence frequency.

10. The system for inputting Chinese characters according to claim 7, wherein graph keys in the set of graph keys are arranged in order of decreasing occurrence frequency from center to periphery.

11. A system for inputting Chinese characters, comprising:
a user device;
a virtual keyboard for inputting characters on the user device and configured to interact with the user device, the virtual keyboard comprising a plurality of virtual keyboard keys, the plurality of virtual keyboard keys comprising a set of graph keys with each key of the set of graph keys being configured to input a separate graph from a set of graphs, a set of keys to input punctuation marks and numbers which form a punctuation and numeric board, and a set of control keys; and
wherein the user device comprises:
a data storage unit configured to store instructions for implementing a method of inputting characters and to store the set of graphs, a characters description table, and a polysyllabic words table, wherein the method of inputting characters comprises the steps of:

selecting a graph from the set of graphs that is a part of a character to be inputted;

including the selected graph into a list of graphs and displaying the list of graphs in a graphs area;

forming a list of characters containing the selected graph by selecting the list of characters from the characters description table based on the list of graphs; and based on a preset character selection mode:
- if there is only one character in the list of characters, automatically transferring the one character from the list of characters to an input focus of a program waiting for input, clearing the list of graphs and the list of characters, and selecting a graph to input a next character; and
- if there is more than one character in the list of characters, displaying the list of characters on a screen, wherein:
  - if a character to be inputted is in a first position of the list of characters, transferring the character from the list of characters to the input focus of the program waiting for input, clearing the list of graphs and the list of characters, and selecting a graph to input a next character; and
  - if the character to be inputted is not in the first position of the list of characters, selecting a next graph, which is a part of the character to be inputted, or selecting the character to be inputted in the displayed list of characters and transferring the character from the list of characters to the input focus of the program waiting for input, clearing the list of graphs and the list of characters, and selecting a graph to input a next character;

a processing unit configured to input the character into the input focus of the program waiting for input by receiving one or more user inputs from the plurality of virtual keyboard keys and processing the one or more user inputs in accordance with instructions stored in the data storage unit; and a screen configured to display the input focus of the program waiting for input, the plurality of virtual keyboard keys, a list of inputted graphs, a list of returned characters, and a list of returned words.

12. The system for inputting Chinese characters according to claim 11, wherein the virtual keyboard is made in one of the three form factors:

a full-size 20×10 keyboard;

a reduced 10×10 keyboard configured to switch parts of the set of graphs assigned to the plurality of virtual keyboard keys by pressing a key from the plurality of virtual keyboard keys of the virtual keyboard and automatically returning to an initial state in response to input of a graph in an alternate keyboard state to which the virtual keyboard was switched by pressing the key; or a compact 10×5 keyboard configured to switch parts of the set of graphs assigned to the plurality of virtual keyboard keys by pressing a key from the plurality of virtual keyboard keys of the virtual keyboard and returning to an initial state in response to repeated pressing of the key.

13. The system for inputting Chinese characters according to claim 11, wherein graph keys in the set of graph keys are arranged in order of decreasing occurrence from center to periphery.

14. A keyboard for inputting characters, connectable to or executed on a user device, that comprises a plurality of keys and includes a set of the following 200 graphs:

一; 丨; 亻; 乙 (乚, 乁, 乛, ⺄, 丿, ;   一); 人; 勹; 日; 白; 于 (亍, a1); 土; 辶; 刀 (⺈, 刂); 丨; 亅; 木; 水 (氵, 氺); 讠 (言); 月; 扌; 丶 ( 丷, 丬); 丷; ⺌; 戈 (弋); 女; 心 (忄, 小); 大; 宀; 卜; 厶; 二; 十; 力; 丨; 纟 (糸); 疋; 寸; 口; 卩; 八; 又; 禾; 土; 山; ⺽ ( ); a2; 丨; 卄; 子; 立; 山; 口; 门; 夕; 米; 广; 文; 乚; 廾; 厂; ⺹ (老); 夂; a3; 羊 (⺷); 里; 尸; 止; 小; 贝; 彳; 攵; 方; 井; 牛 ( ; 处; 火 (灬); 斤; 冫; 覀 (西); 车; 匕; 示 (礻); 民; 巾; 生; 车; 匕; 示 (礻); 民; 巾; 生; *; 镸; 走; 耳; 甘; 卩 ( 曰); 彐 (⺕); 金 (钅); 乂; 丬 ( ; 廾, 彐); 弓; 青; 隹; 户; 用; 舌; 缶; 山; 氏; 几; 丑; 足; 贝; 衣 (衤); 音; 士; 行; 穴; 石; 丁; 矢; 而; 镸; 欠; 月 (肉); ⺌ (爪); 马; 肖; 面; 父; 攵; 彡; 伯; 皮; 高; 冂; 比; 丰 (; 申; 无; 罒; 皿; 非; 身; 虫; 支; 雨; 斗; ⺲ (网); 扩; 川; (巛); 气; 食 (飠); 齐; 入; 卯; 酉; 舟; 片; 牙; 采; 谷; 革; 风; 尤; 豆; 广; 止; 幺; 书; 鸟; 毛; 黑; 辛; 麻; 玄; 鱼; 羽; 虎; 龙; 门; 飞; 鼠; 缶; 黄; 飞; 鬼; 缶; 黄; 香; 矛; 瓜; 来; 瓦; 齿; 豸; 向; 舛 wherein:
variants of some of the 200 graphs are indicated in parentheses;

symbols a1, a2, and a3 denote graphs unrepresented in UNICODE where a1 indicates a first (upper-left) graph of character 左, a2 indicates a first (upper) graph of character 幺, and a3 indicates a first (two central vertical strokes) graph of character 业; and graph keys in the plurality of keys are arranged in order of decreasing occurrence frequency from center to periphery.

\* \* \* \* \*